United States Patent
Bryan, Jr. et al.

(10) Patent No.: US 8,371,773 B2
(45) Date of Patent: *Feb. 12, 2013

(54) TRANSPORT SYSTEM FOR FRUIT AND LIKE OBJECTS

(75) Inventors: Vincent E. Bryan, Jr., Quincy, WA (US); John Ohrt, Mercer Island, WA (US); Randy Allard, Issaquah, WA (US); Polly Allard, Mercer Island, WA (US); Gene Barrow, Mercer Island, WA (US); Pete Kunzler, Mercer Island, WA (US); Vincent Bryan, III, Mercer Island, WA (US); Alex Kunzler, Issaquah, WA (US)

(73) Assignee: Picker Technologies LLC, Bellevue, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/758,653

(22) Filed: Apr. 12, 2010

(65) Prior Publication Data

US 2011/0091292 A1    Apr. 21, 2011

Related U.S. Application Data

(63) Continuation-in-part of application No. 12/055,209, filed on Mar. 25, 2008, now Pat. No. 7,695,220.

(60) Provisional application No. 60/920,069, filed on Mar. 26, 2007, provisional application No. 60/949,630, filed on Jul. 13, 2007.

(51) Int. Cl.
*B65G 53/58* (2006.01)

(52) U.S. Cl. .......................................... 406/84; 406/191
(58) Field of Classification Search .................... 406/83, 406/191, 192, 193, 195, 196
See application file for complete search history.

(56) References Cited

U.S. PATENT DOCUMENTS

| 1,114,318 | A |   | 10/1914 | Vasey |
| 1,626,402 | A |   | 4/1927  | Fryman |
| 2,078,984 | A | * | 5/1937  | Williamson .................. 194/301 |

(Continued)

FOREIGN PATENT DOCUMENTS

| WO | WO 00/62594 A1   | 10/2000 |
| WO | WO 2008/118915 A1 | 10/2008 |

OTHER PUBLICATIONS

Brennan, J. "Beach Pneumatic. Alfred Beach's Pneumatic Subway and the Beginnings of Rapid Transit in New York." May 2004, formerly published on web at: http://www.columbia.edu/'brennan/beach/. (Link is no longer available.).

(Continued)

*Primary Examiner* — Gene Crawford
*Assistant Examiner* — William R Harp
(74) *Attorney, Agent, or Firm* — Hughes Socol Piers Resnick & Dym, Ltd.; Todd S. Parkhurst

(57) ABSTRACT

A device for transporting articles is disclosed. In the illustrated and described embodiment of the invention, the articles are fruit such as apples, and the articles can be transported from a picking location on a fruit tree to a collection bin or other site. The device includes a tube member adapted to receive and transport the articles, and a plurality of deformable baffles at spaced-apart locations within the tube. Each baffle defines an aperture which permits the article to engage and deform the baffle and aperture so as to create at least a partial momentary seal to encourage article movement through the aperture and down the tube. The article is urged through the tube by a pressure differential created across the article. In the described and illustrated embodiment of the invention, this pressure differential is a pneumatic pressure differential. The tube and the baffle apertures can have non-circular cross-sectional shapes.

16 Claims, 26 Drawing Sheets

U.S. PATENT DOCUMENTS

| | | | |
|---|---|---|---|
| 2,288,682 A | 7/1942 | Chittenden | |
| 2,545,072 A | 3/1951 | Denman | |
| RE23,524 E | 7/1952 | Denman | |
| 2,650,464 A | 9/1953 | Bernheim | |
| 2,680,338 A | 6/1954 | Space | |
| 2,711,625 A | 6/1955 | Bullock | |
| 2,775,088 A | 12/1956 | Bullock | |
| 3,473,312 A | 10/1959 | Holt | |
| 2,968,907 A | 1/1961 | Bernheim et al. | |
| 3,165,880 A | 1/1965 | Buie, Jr. | |
| 3,413,787 A | 12/1968 | Van Antwerp et al. | |
| 3,460,327 A | 8/1969 | Johnson et al. | |
| 3,460,330 A | 8/1969 | Black, Jr. | |
| 3,470,990 A * | 10/1969 | Mcnenny | 193/7 |
| 3,489,258 A | 1/1970 | Stokes | |
| 3,507,107 A | 4/1970 | Harms et al. | |
| 3,538,695 A | 11/1970 | Carnell | |
| 3,559,387 A | 2/1971 | Myers | |
| 3,564,826 A | 2/1971 | Middleton, Jr. | |
| 3,584,442 A | 6/1971 | White | |
| 3,591,949 A | 7/1971 | Connery | |
| 3,664,104 A | 5/1972 | Jamshidi | |
| 3,756,001 A | 9/1973 | Macidull | |
| 3,767,268 A | 10/1973 | Stucky | |
| 3,854,273 A | 12/1974 | Rosenberg | |
| 3,898,785 A | 8/1975 | Chew | |
| 3,913,307 A | 10/1975 | Cardinal, Jr. | |
| 3,918,116 A * | 11/1975 | Valdespino | 15/3.13 |
| 3,934,691 A | 1/1976 | Toloczko | |
| 3,969,878 A | 7/1976 | Morganeier | |
| 4,000,602 A | 1/1977 | Cardinal, Jr. | |
| 4,320,995 A | 3/1982 | Tennes et al. | |
| 4,388,798 A | 6/1983 | Gerber | |
| 4,394,259 A | 7/1983 | Benny et al. | |
| 4,476,670 A | 10/1984 | Ukai et al. | |
| 4,491,212 A | 1/1985 | Gray, Jr. | |
| 4,501,113 A | 2/1985 | Gerber | |
| 4,558,561 A | 12/1985 | Mendenhall | |
| 4,674,265 A | 6/1987 | Gerber | |
| 4,704,851 A | 11/1987 | Manor | |
| 4,750,602 A | 6/1988 | Souda | |
| 3,484,529 A | 9/1989 | Horsky | |
| 5,007,772 A | 4/1991 | McKenna et al. | |
| 5,125,223 A | 6/1992 | McKenna et al. | |
| 5,205,677 A | 4/1993 | McKenna | |
| 5,280,697 A | 1/1994 | Miller | |
| 5,319,911 A | 6/1994 | Wilhite | |
| 5,371,711 A | 12/1994 | Nakayama | |
| 5,473,114 A * | 12/1995 | Vogel | 174/47 |
| 5,599,157 A | 2/1997 | Ellington | |
| 5,840,102 A | 11/1998 | McCracken | |
| 5,878,562 A | 3/1999 | Cemusco | |
| 6,182,431 B1 | 2/2001 | Balchen | |
| 6,827,529 B1 | 12/2004 | Berge et al. | |
| 6,840,715 B2 | 1/2005 | Pescia | |
| 7,695,220 B2 * | 4/2010 | Bryan et al. | 406/84 |
| 7,815,401 B2 * | 10/2010 | Bryan, Jr. | 406/197 |
| 2005/0172595 A1 | 8/2005 | Wells et al. | |
| 2008/0010961 A1 | 1/2008 | Gray | |

OTHER PUBLICATIONS

Fox, Robert W. and McDonald, Alan T. "Introduction to Fluid Mechanics." Purdue University School of Mechanical Engineering, John Wiley & Sons, 4th Ed., pp. 124, 380-84, 633. New York, NY 1992.

* cited by examiner

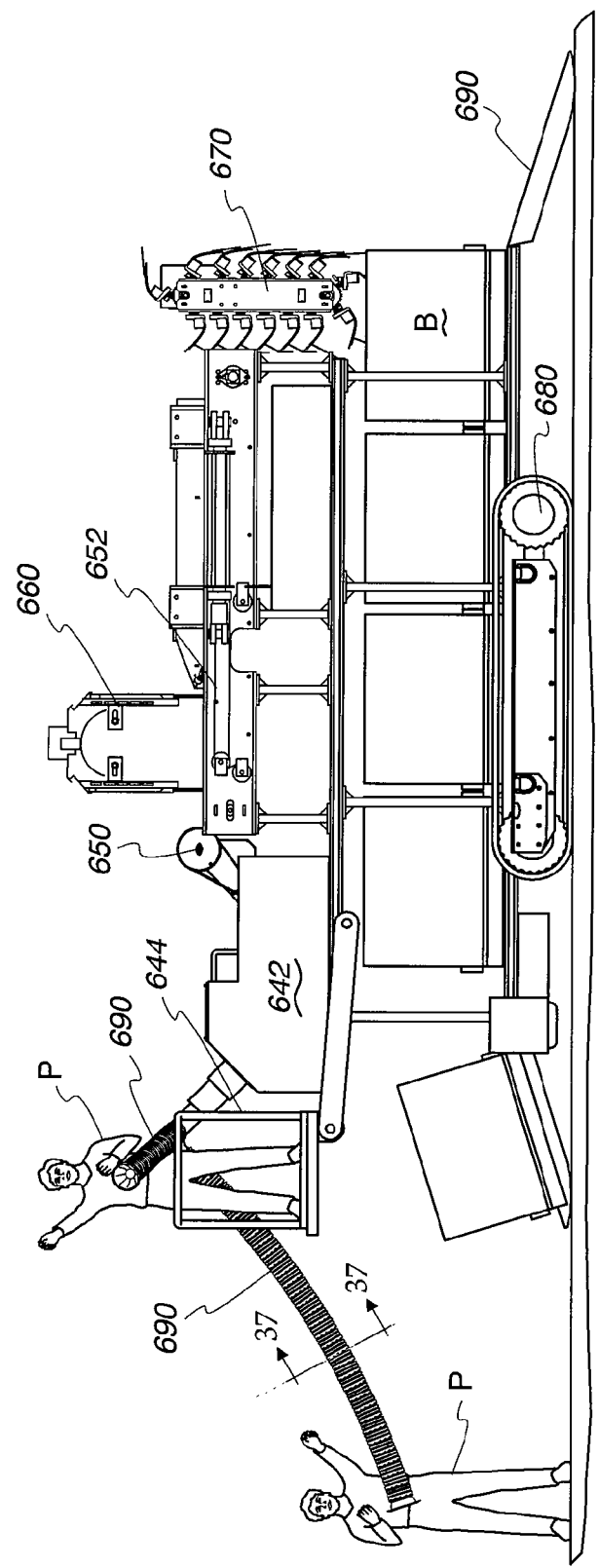

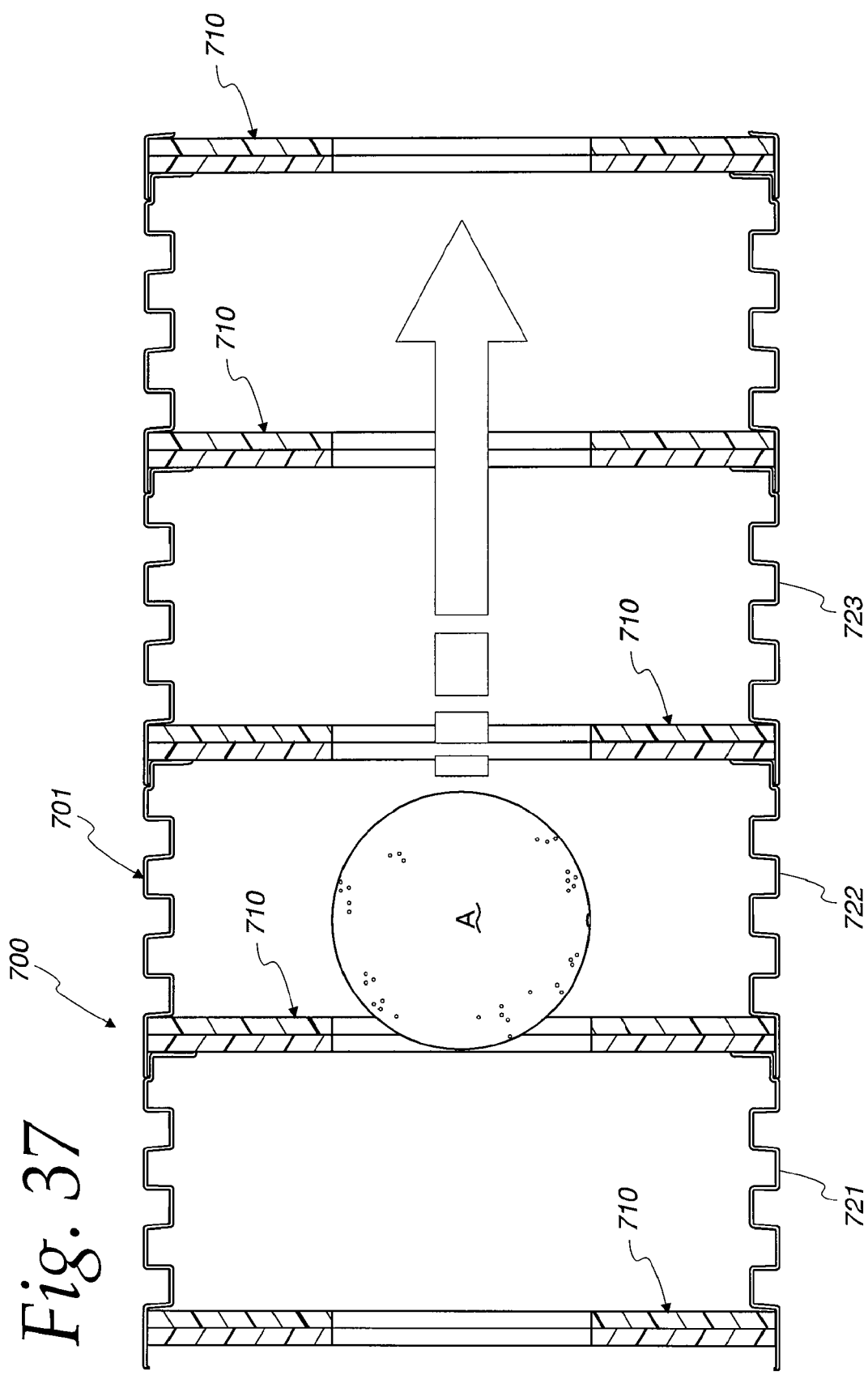

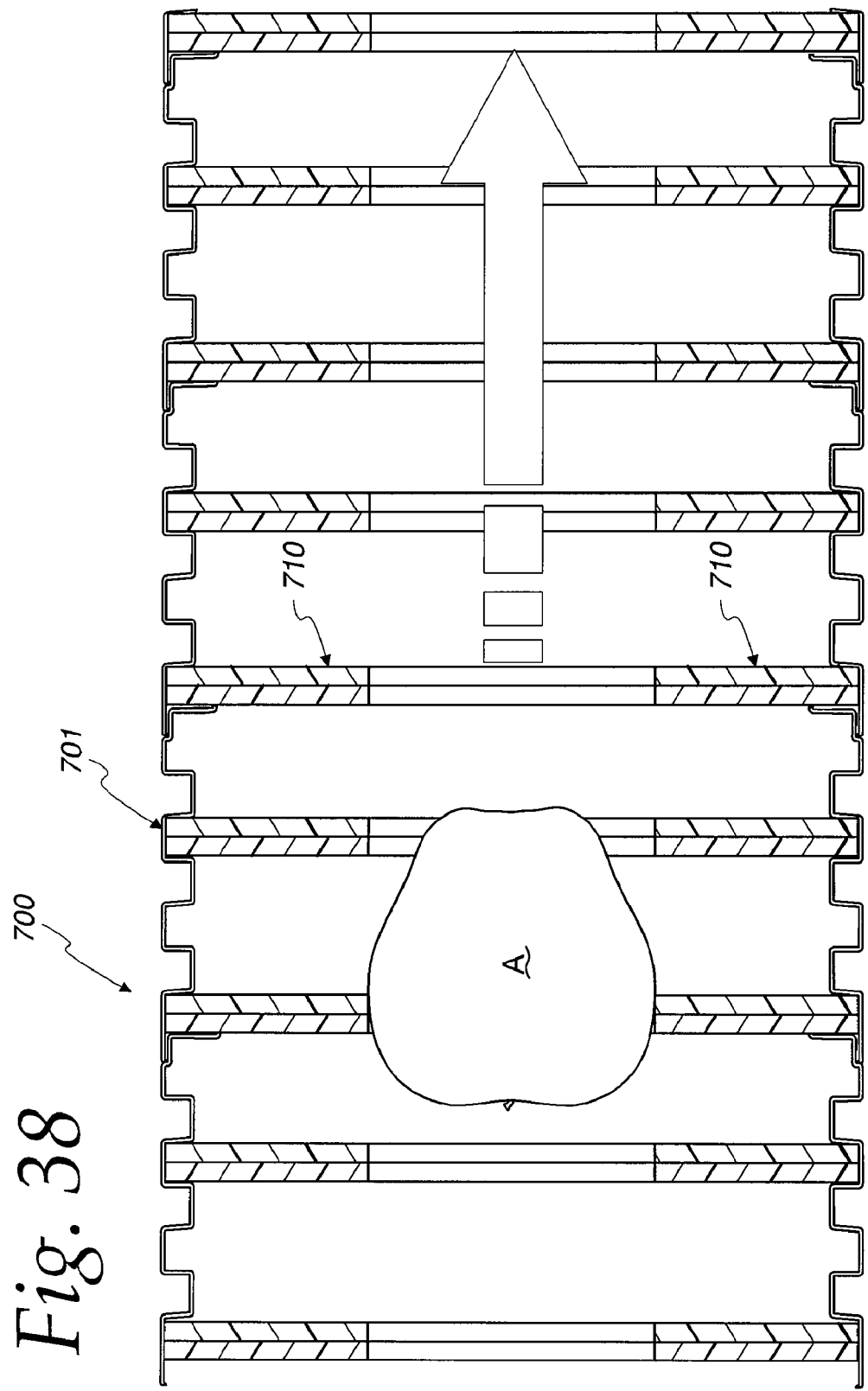

TRANSPORT SYSTEM FOR FRUIT AND LIKE OBJECTS

This application is a Continuation-In-Part of U.S. Ser. No. 12/055,209 filed Mar. 25, 2008, Publication No. US-2008-0279640-A1 published on Nov. 13, 2008, expected to issue as U.S. Pat. No. 7,695,220 on Apr. 13, 2010, which claims domestic priority from U.S. Ser. No. 60/920,069 filed Mar. 26, 2007 and Ser. No. 60/949,630 filed Jul. 13, 2007, all of which are incorporated herein by reference.

BACKGROUND OF THE INVENTION

This invention relates generally to systems for transporting small objects, and more particularly relates to pneumatic transport systems.

Presently in the fruit industry, most specifically in the apple industry, fruit is traditionally handpicked. The pickers carefully place the fruit in apple bags which are worn on the shoulders of the pickers, extending downward over the chest and abdomen to the groin. The pickers then gently release the fruit into large bins for later transport to a packing or processing plant. This technique provides for the "on-tree" selection by the picker of the appropriate fruit (apples) for picking utilizing the visually discernible criteria of color size and quality. Good pickers remove the fruit from the tree while keeping the stem intact on the fruit so as to maintain the integrity of the following years fruiting bud on the tree. On occasion, the picking operations must contend with the clipping of overly stiff or long stems; the gentle placement of the fruit into the picking bag to prevent bruising; and the transfer and delivery of the fruit to a larger size container better adapted for truck transport. Fruit located on high limbs may require that the picker climb a ladder or stand on a scaffold to reach the fruit. The fruit bins are usually placed in the row between tree lines, and the bins are spaced so that they can be filled by fruit transferred from the picker's bag within the shortest walking distance. The bins are then picked up by a fruit trailer pulled by a tractor and taken to a common holding site awaiting forklift placement onto a flatbed truck.

This fruit picking process results in about 30% of the picker's time actually picking fruit, with the remaining 70% of the time gently placing the fruit into bags or bins after having clipped the stems when required, moving and climbing up and down ladders, carrying fruit from one place to another, then walking to and carefully releasing the picker's bag load of apples into the collecting bin taking special care not to cause a blemish or bruise on the fruit by rough handling. The picker's bag load may weigh 40 pounds or more leading to fatigue of the picker and a reduction in efficiency.

Due to the seasonal nature of the fruit harvest, fruit pickers are frequently found amongst migrant worker groups often from countries outside the United States. As a result of stringent U.S. immigration policies, a sufficient numbers of pickers may not be available to pick the fruit at harvest time. Due to the slowness of the fruit handpicking process, large numbers of pickers are required when the fruit reaches the proper point of ripeness. Since individual productivity is low when fruit is handpicked, wages remain low for the individual picker. This in turn results in the propagation of a population of below average wage earners.

It is an objective of this invention to improve the productivity of the individual picker while maintaining the advantages of the hand picking process, namely: selectivity of fruit to be picked, gentleness to prevent bruising at all stages of movement and packing and stem trimming when needed is desirable.

To accomplish this objective, a system involving specially modified and augmented pneumatic tubes is presented.

DESCRIPTION OF THE DRAWINGS

FIG. 3a is an elevational view showing a typical apple picker and his apple picking station, and suggesting how the station can be moved relative to the platform upon which the station is mounted.

FIG. 36 is an elevational view of another embodiment of the invention and another embodiment of a mobile platform with which the invention can be used.

FIG. 38 is a cross-sectional view of another embodiment of the transport tube system similar to FIG. 37 but showing a generally conical object such as an apple moving through the system.

DETAILED DESCRIPTION

Figure 1:
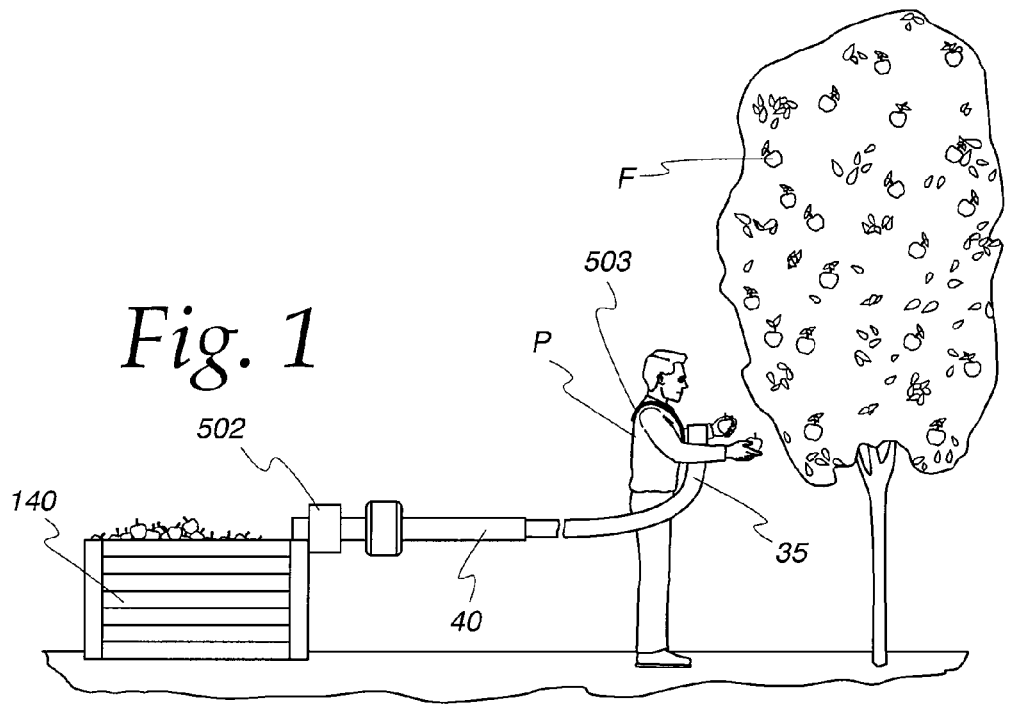
FIG. 1 is an elevational view showing an exemplary apple picker who is picking apples from a tree and depositing the apples in a first embodiment of the invention for transport to an apple collection bin.

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

In one embodiment, the transport tube invention and its peripheral equipment act together to transport picked fruit gently yet quickly up and/or down and/or along a rigid or flexible tube pathway.

Pneumatic Tubes for Moving Items

In 19th-century Europe, public and technical interest arose in the idea of so-called atmospheric railways. Original proposals called for the use of pneumatic tubes to carry letters, packages and even passenger trains, cars and freight. The train might be thought of as a series of car capsules or canisters into which people or items of an undetermined shape entered before being moved along as a result of an exterior force applied to the train cars. If a seal were to be created between the canister cars and the interior surface of the tunnel, the canister cars could be moved through the tube by providing relatively low pneumatic pressure at the forward end of the train and a relatively high pneumatic pressure at the rear end of the train. Later proposals suggested the use of a small pneumatic tube located alongside an ordinary railway track; a piston inside the tube would pull an attached train running on the rails. The ultimately successful alternative of pulling railway trains through tunnels or tubes behind steam locomotives was extensively developed during the same years. A copy of a descriptive article is in the file history of this patent application, and is available to the public.

In 1840, Samuel Clegg and Jacobs Samuda (British subjects) obtained U.S. Pat. No. 1,922 for the Construction of Valves for Pneumatic Railways. Implementation of that patent led to the successful movement of a train on wheels on a track positioned within a tube for a distance of one block. U.S. Pat. Nos. 255,525 and 284,456 disclose early pneumatic systems for so-called store service carriers.

The fundamental concept common to previous pneumatic systems for movement of items relies on one or more seal members affixed to the moving item. These seal members provide a pneumatic seal between the moving item and the interior surface of the tube. The item to be transported (which may be of any shape) is placed within a canister of predetermined shape. An exterior flange-like seal secured to the canister moves along with the canister through the tube. The seal continuously engages the interior surface of the tube so as to provide an air seal. This air seal permits the development of a pneumatic pressure differential in the tube between the upstream and downstream surfaces of the seal and capsule. The force of this air pressure differential propels the capsule and seal along the tube.

Pneumatic Transport or Movement Device

The object of this invention is to rapidly move items through a pneumatic tube independent of the items' shapes without having to place the items into a capsule or canister of fixed shape. A means to create a seal sufficient to allow the pressurized system to advance the item through the tube is required. An embodiment of the new concept focuses on a sealing arrangement, but the seals do not move along through the tube. The sealing arrangement nevertheless can maintain a proper environment for effectively providing pneumatically induced movement of the item through the tube.

In accordance with the invention, a series of sealing baffles are affixed to the interior wall of the tube and can accommodate items of different sizes and shapes while maintaining a series of pneumatic seals between the sealing baffles and the items moving down the tube.

Figure 2:
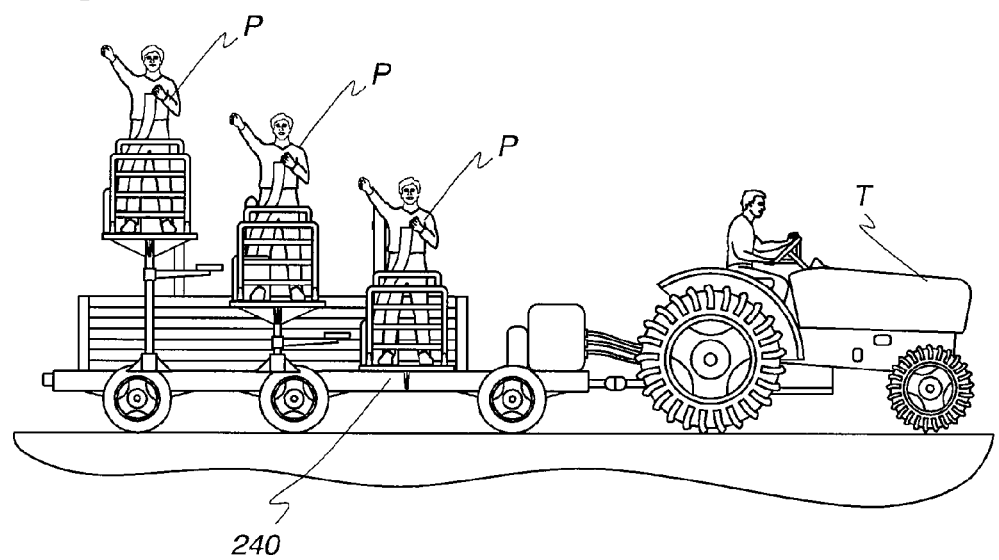
FIG. 2 is an elevational view showing a tractor and trailer upon which are mounted apple picking stations being used by apple pickers who are depositing the picked apples in an embodiment of the invention for transport to an apple collection bin.
Figure 3:
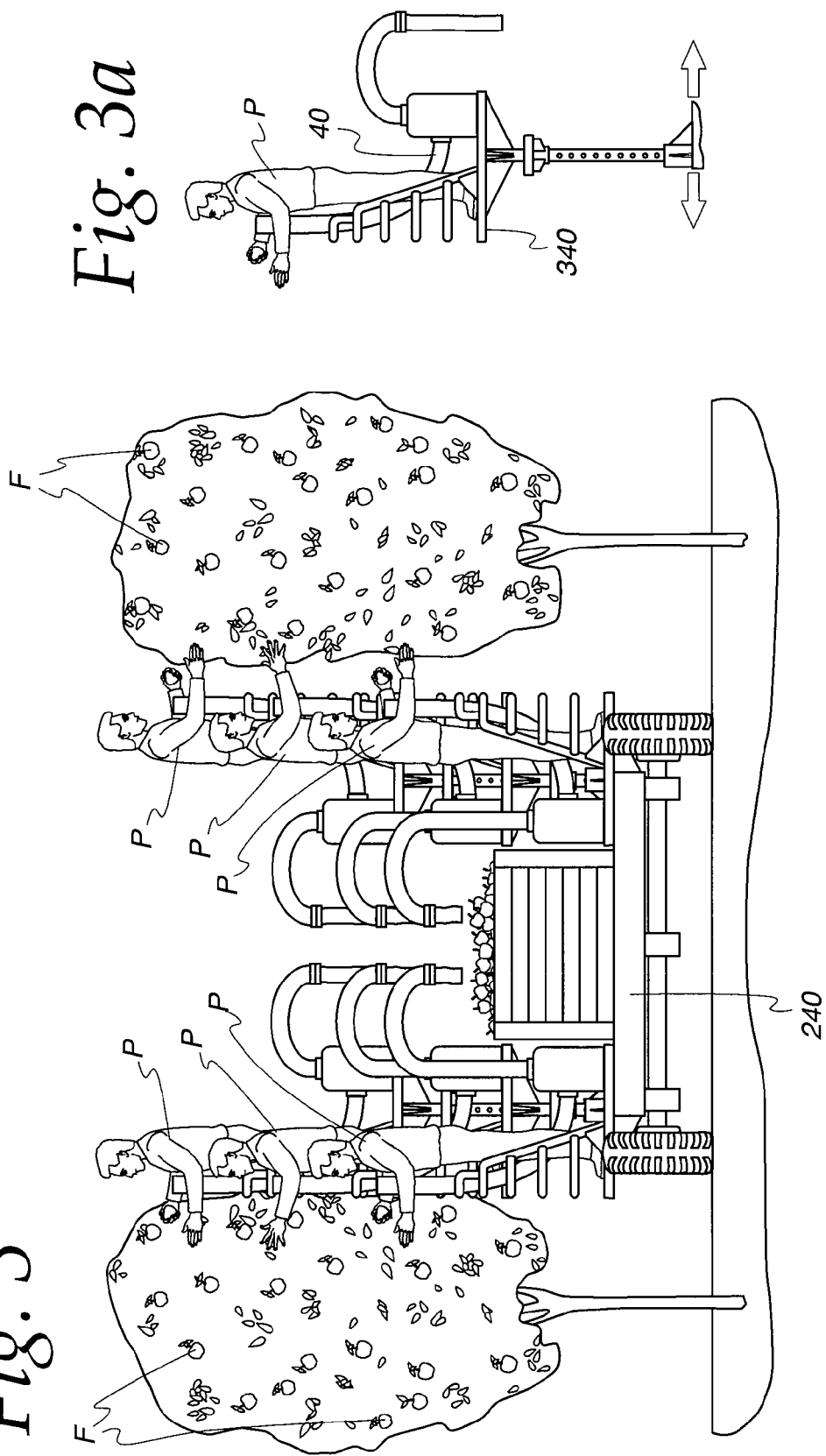
FIG. 3 is an elevational view similar to FIG. 1 but showing typical apple pickers and a trailer as they appear from the rear of the trailer.

As suggested in FIGS. 1-3 and 3a, this pneumatic tube system can be used by individual pickers P. Each picker can have an input chute 35, which can be located and worn adjacent the picker's chest by a known and convenient harness means 503. The chute 35 leads to a pneumatic tube 40 which transports the picked fruit to a bin 140 or other collection device. If desired, the tube transport system and the pickers P can be mounted on a trailer 240 pulled by a tractor T as shown in FIG. 2. Alternatively, the systems and pickers can be mounted on a self-propelled vehicle as indicated in U.S. provisional patent application Ser. No. 61/028,351 filed Feb. 13, 2008, now co-pending utility application Ser. No. 12/371, 446 filed Feb. 13, 2009 and entitled "Mobile System For Improving The Picking And Preliminary Processing Of Apples, Citrus, Stone Fruit And Like Objects," incorporated herein by reference. Or the systems can be mounted on a sled, a movable frame, or even a stationary pad.

To reach apples or other fruit at various heights in the trees, the pickers P can be provided with picking stations or platforms 340 as especially suggested in FIG. 3a. The positions of these stations 340 can be adjusted by known hydraulic or other systems as suggested by the arrows in FIG. 3a.

As shown in FIGS. 4-12 and elsewhere, one embodiment of the invention comprises a tube 40 which may be rigid or flexible and made of plastic, metal or other suitable material. The tube can be of circular, and/or any convenient cross-sectional shape, as described below. In accordance with the invention, a series of sealing baffles 50 are provided at spaced apart locations within the interior of the tube. Each baffle is affixed to the interior of the tube 40, is aligned in a perpendicular fashion relative to the tube axis, and is made of a resilient smooth-surface material such as a silicon rubber or resilient plastic. The spacing between the baffles 50 can be selected to be approximately the same as the minor dimension of the items to be moved through the transport tubes. The system will perform but perhaps less effectively if the baffle-to-baffle distance is made to be substantially greater or less than this item's minor dimension. For example, the major dimensions of the article to be transported through that tube can be determined by measuring the article. The spacing of the baffles within the tube can be provided or adjusted to be a distance approximately equal to the previously measured or determined dimension of the article to be transported. Experimentation with the tube, the baffle spacing and the articles to be transported may show that effective transportation occurs if the baffles spacing is somewhat less than the major or minor dimension of the article to be transported or even somewhat greater than the major or minor dimension of the article to be transported. For example, baffles having two-inch diameter apertures may be spaced one inch apart.

During transport of an object, aberrant vibrations or oscillations can cause the object to resonate and deviate from its intended path. The unwanted resonation will cause the fruit to centrifugally be thrown outward and get lodged or stuck between baffles. In some cases, the object being transported can be bounced backwards thereby lessening the effectiveness of object transport. Decreasing the spacing of the baffles to be less than the major dimension of the transported object enhances object transport around corners, lessens wall impact, dampens oscillation and vector directs, and aides in preventing lodging of the object within a space.

If the baffle spacing is arranged to be substantially equal to or less than the effective dimension of the article to be transported, it is possible to inhibit or prohibit the object from ever engaging the inner surface of the transport tube as the object or article moves through the tube. Under these circumstances, object bruising or damage may be inhibited or prohibited.

In an alternative embodiment of the invention, groups of closely-spaced multiple baffles may be located at major intervals along the tube interior.

Figure 13:
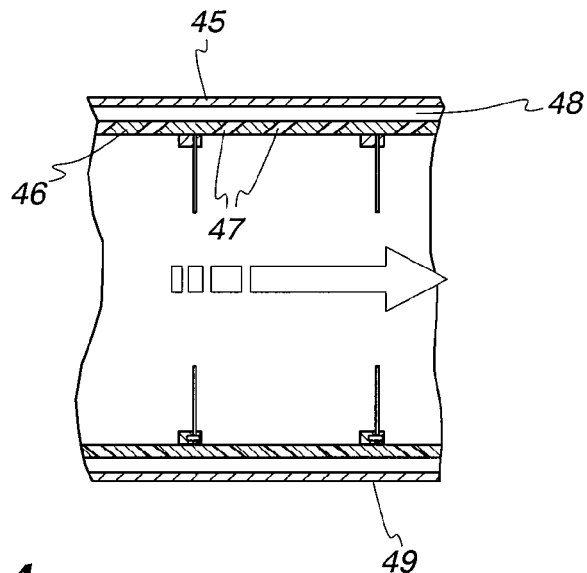
FIG. 13 is a fragmentary sectional view showing an embodiment of the invention including an outer tube, an inner transport tube, air movement spaces between the tubes, and baffles.
Figure 14:
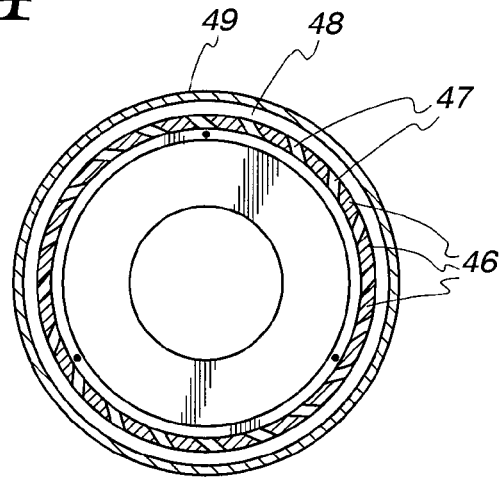
FIG. 14 is a sectional view of the tube and baffle arrangement shown in FIG. 13.
Figure 15:
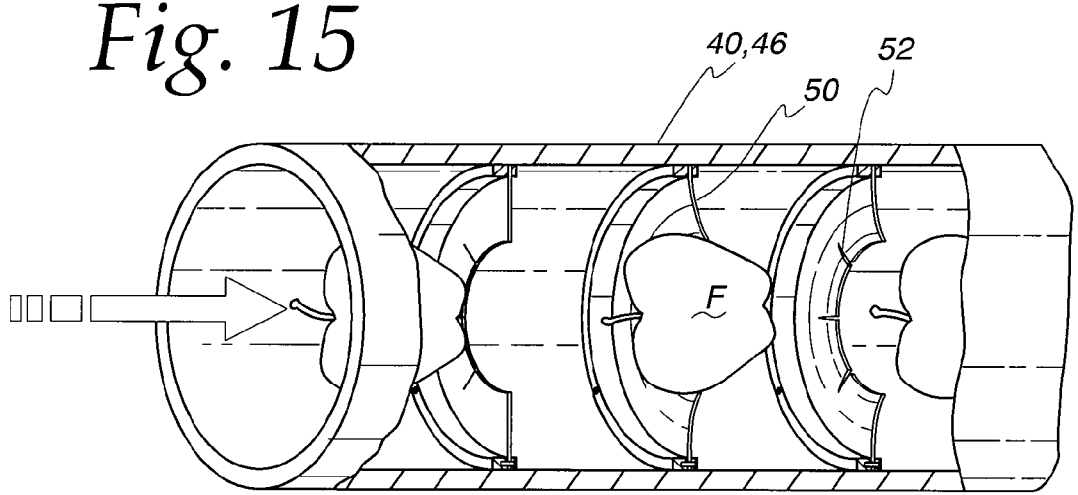
FIG. 15 is a fragmentary view in partial section suggesting the movement of typical objects such as apples through the inventive tube and baffles.
Figure 16:
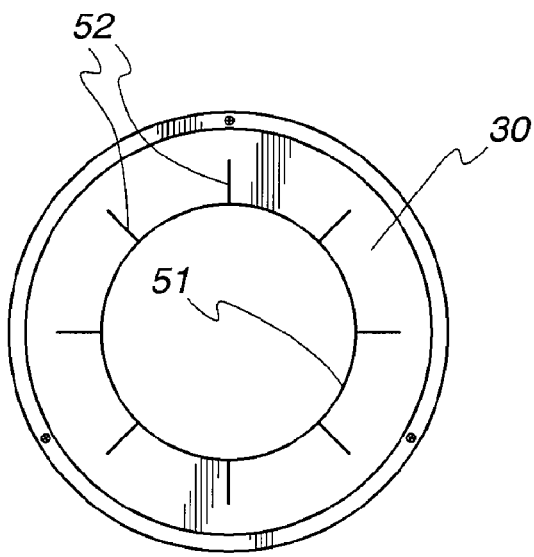
FIG. 16 is an elevational view showing a baffle of the type included in the tube shown in FIG. 15.
Figure 17:
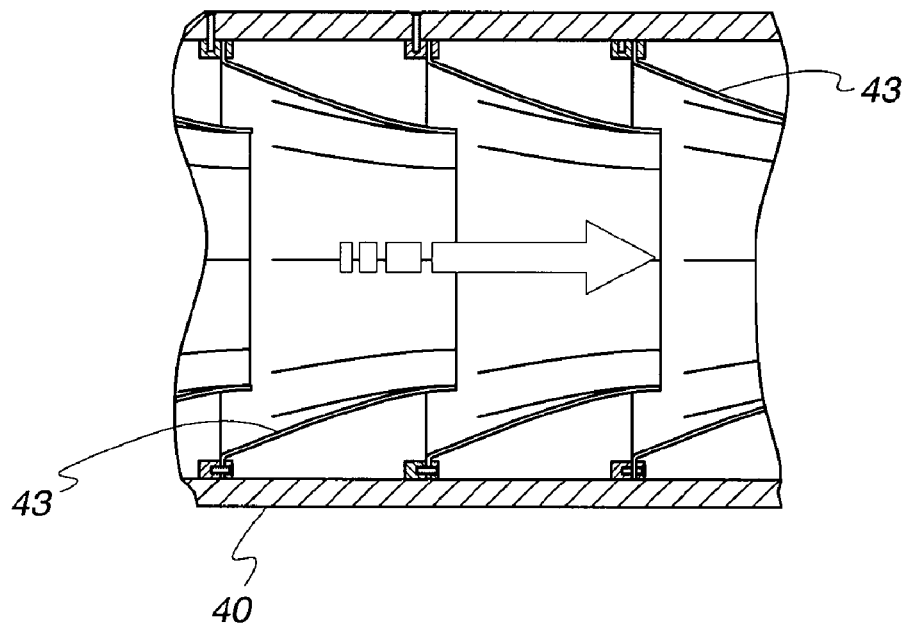
FIG. 17 is a fragmentary view in sectional aspect showing conical or windsock baffles within the transport tube.

Preferably, the baffles each define a central opening or hole 51. The outer periphery of the baffle, and the periphery of the hole 51, can be of any convenient shape such as circular, oval, elliptical, quadrilateral, or other shape. As suggested in FIG. 15, the central circular opening 51 is of such diameter that an item A which is greater in diameter than the hole 51 but lesser in diameter than the tube can pass through the tube because of the elasticity of the baffle 50. As suggested in FIGS. 13, 14, 15 and elsewhere, the baffles 50 can be spaced apart from one another by a distance substantially equal to the diameter of the baffle aperture or hole 51.

The baffle 50 may have slits 52 extending from the central opening into the baffle material to facilitate its opening to accommodate a relatively loose item F passing through it. If small items A are to be moved, the slits 52 may not be needed. Alternatively, the baffles 50 can be inflatable. The material comprising the inflatable baffles can be shaped and arranged so that progressive inflation of the baffle will provide a progressively smaller opening 51, or the shape of the opening 51 will be progressively changed in some other way.

Throughout the time of engagement of the item in the central opening of the baffle, a more or less imperfect pneumatic seal is temporarily made between the object and the baffle surface, and the object experiences a pressure differential across the seal. When the pneumatic system (vacuum or air pressure) pulls and or pushes it free from an upstream baffle, the item rapidly advances to the next baffle opening where the phenomenon is repeated for the full length of the baffle segmented tube.

To minimize any traumatic effect on the item A being moved through the tube 40 in further accordance with the invention, the interior of the tube surface located between the resilient periodic baffle members 50 may be lined with a soft material 41 such as a soft rubber or resilient plastic. Alternatively, a series of many soft cushions such as outcroppings of small flexible finger-like extensions 42 or a soft inflatable air-filled balloon-like interior wall liner can be provided between the baffles as particularly suggested in FIGS. 6, 7 and 24-26.

An alternatively shaped baffle arrangement is shown in FIGS. 8, 9, and 15-17. There, conical or windsock-shaped baffles 43 are attached by a fixation device 44 on the interior surface of the tube. The windsock baffles 43 can be made of a material which may be woven or formed of a resilient material such as rubber or resilient plastic. The material may be of such a nature that it may collapse onto the surface of the item being moved through it while at the same time allowing the item to advance with minimal impedance. These interior windsocks 43 can be spaced apart from one another such that the item, on leaving one windsock baffle 43, will at that moment be delivered into the next overlapping windsock baffle 43 in the series as particularly suggested in FIG. 8, thus maintaining a substantially continuous seal as the item moves down the tub. If a live fish is to be transported, these conical or windsock-shaped baffles 43 may inhibit the fish's nose from becoming lodged at the intersection of the tube inner surface and the baffle, thereby encouraging the fish to journey smoothly down the tube.

Several variations of these baffles 50 are shown in FIGS. 30-34. The baffles 50 may have a disc shape as suggested in FIG. 30, or it may have a generally conical shape, as suggested in FIG. 31. This conical shape will help orient the moving object in the central axis of the tube and baffle. Alternatively, the baffles 50 may have a modified conical shape as suggested in FIG. 32. This shape may provide a venturi-like effect to the airflow passing through the baffles 50. The disc 50 may have guide plates 54 as suggested in FIGS. 33 and 34.

The tubes 40 illustrated here can comprise an outer tube 45 and a coaxial inner tube 46 having apertures 47 therein. This tube arrangement permits the creation of an air flow liner 46 thereby facilitating the maintenance of the object moving through the tube in a more central position in the tube 40, while at the same time placing an axially extending air space 48 between individual objects F which may be moving through the tube 40 at the same time. Additionally this arrangement will allow for the effect of either vacuum or positive air pressure applied to the tube to reach more than one item moving through the tube at the same time.

Other means of achieving similar effect(s) can be accomplished by having air movement portals periodically and circumferentially placed in the tube. As suggested in FIGS. 9-12 and elsewhere, peripheral air movement occurs through the space 48 between the outer tube 40 and the baffle-containing inner tube 49 while at the same time central air movement is occurring through the inner tube 49. These portals may be of the same or different diameters, and aligned either perpendicular to the inner tube surface or at the same or varied angles to achieve the desired effect(s). The tubes 40 and 49 may be rigid or flexible.

Figure 10:
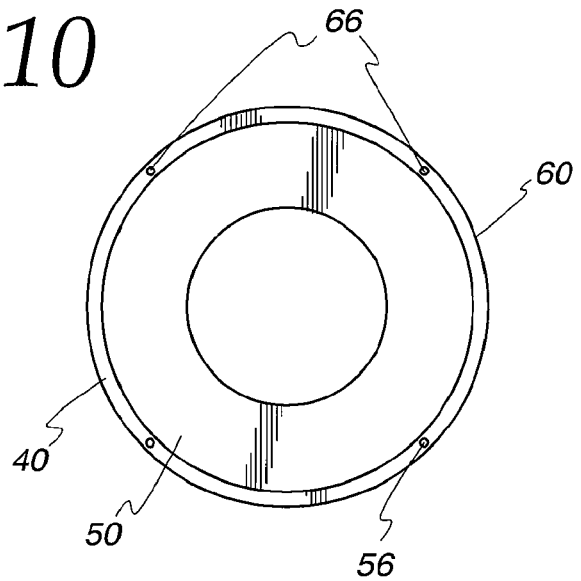
FIG. 10 is an elevational view of an alternate form of a baffle.
Figure 11:
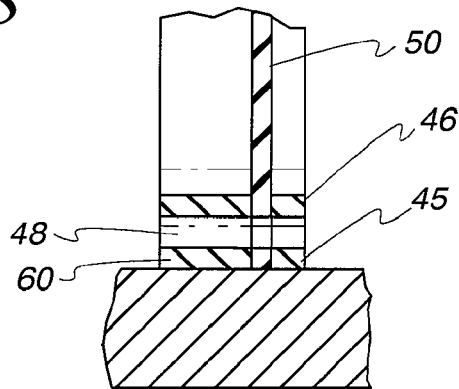
FIG. 11 is a fragmentary view showing, in section, an alternate arrangement of the tube and baffles shown in FIG. 7 or 8 and 10.
Figure 12:
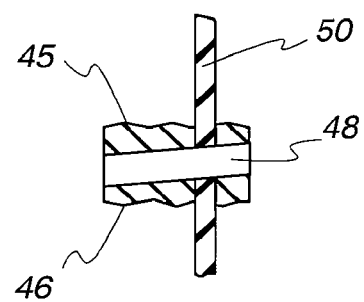
FIG. 12 is an enlarged fragmentary view showing in further detail the arrangement of a baffle and air holes shown in FIG. 11.

A retainer ring 60 is shown in FIGS. 10 and 11, wherein the retainer ring 60 is perforated by peripheral holes 66 which may be of different diameters and either perpendicular to or angled in any direction with relationship to the surfaces of the retainer ring 60. These holes 66 allow for the passage of air from one inter-baffle space to another.

As suggested above, modified airflow and air pressures within the tubes can be provided by an arrangement of a coaxially aligned outer tube 45 and an inner tube 46 (FIGS. 10-14). The toridal-shaped space 48 between the tubes 45 and 46 allows air to be exhausted along the entire length of a tube line. Portals 47 can be provided to inject or exhaust air so as to provide the desired positive or negative pressures for urging the objects F along the tubes in accordance with the invention. These passages 47 can be formed so as to provide a helical air flow as suggested especially in FIG. 14. This helical air flow may discourage the moving objects F from violently impacting the inner tube sides and consequently suffering bruising or other damage.

Figure 18:
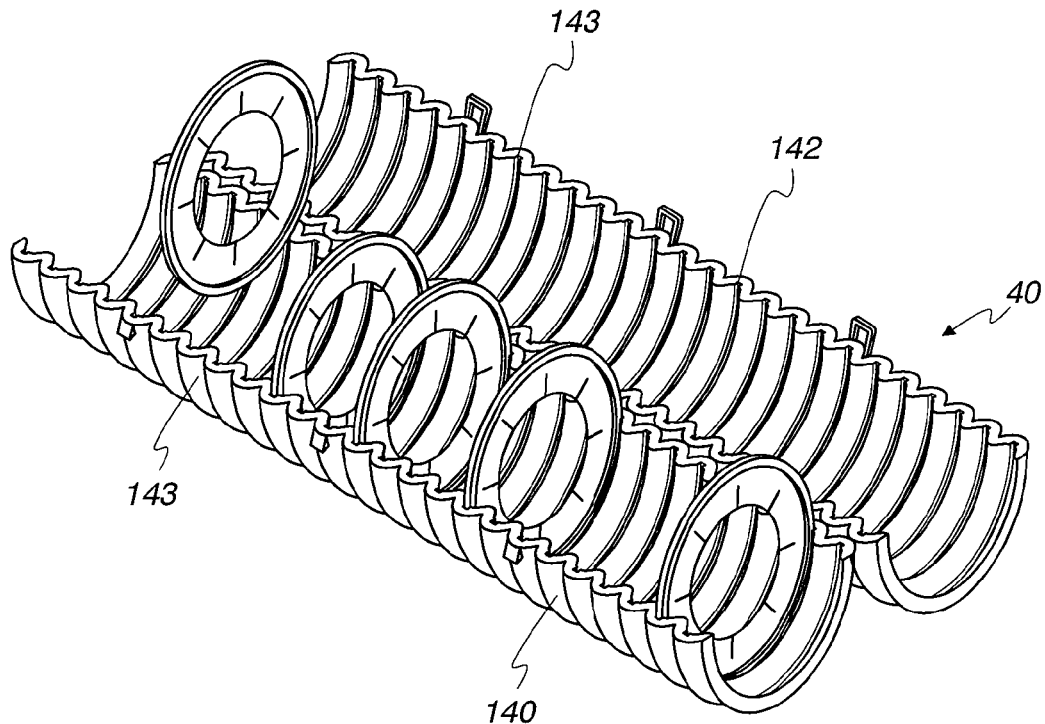
FIG. 18 is an isometric view showing how one embodiment of the transport tube and baffles can be assembled.
Figure 18A:
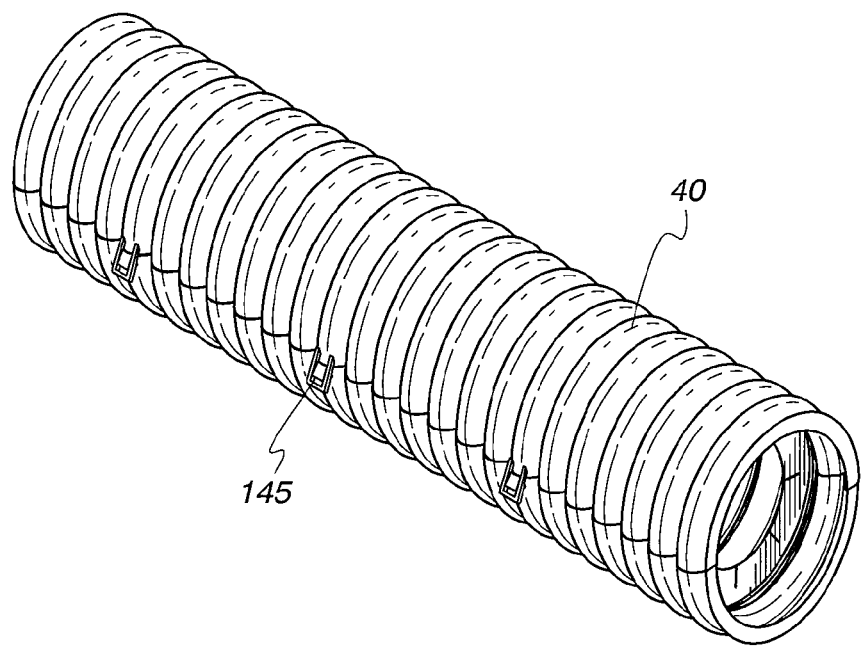
FIG. 18a is an isometric view showing the tube of FIG. 18 in its assembled configuration.
Figure 19:
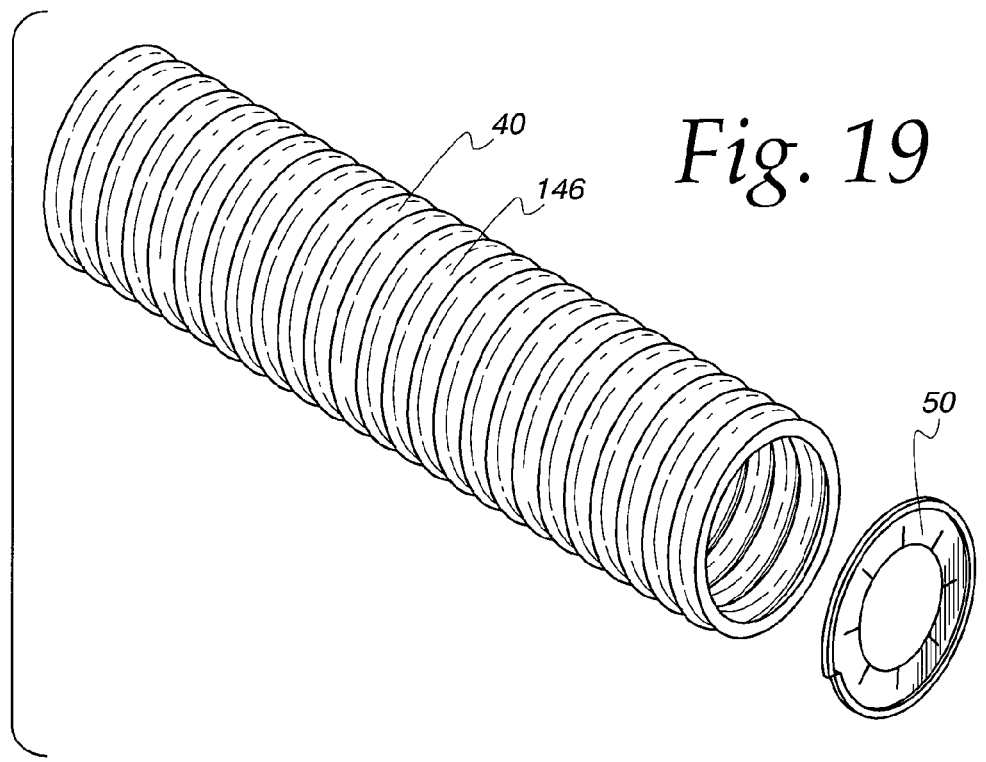
FIG. 19 is in isometric view similar to FIG. 18 but showing how another embodiment of the transport tube and baffles can be assembled.
Figure 19A:
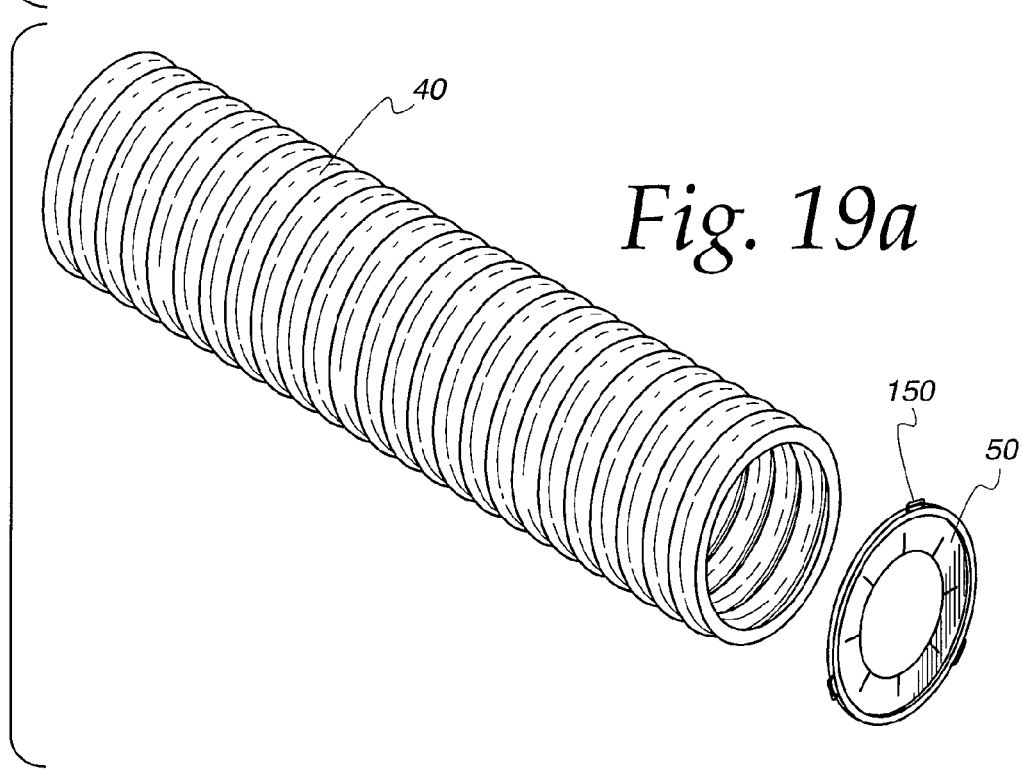
FIG. 19a is an isometric view similar to FIG. 19 but showing how yet another embodiment of the transport tube and baffles can be assembled.
Figure 20:
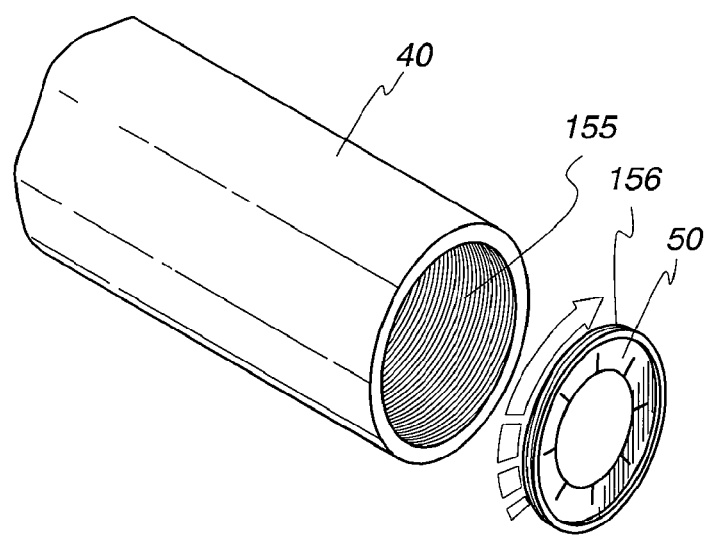
FIG. 20 is an isometric view similar to FIGS. 18 and 19 showing how still another embodiment of the transport tube and baffles can be assembled.
Figure 21:
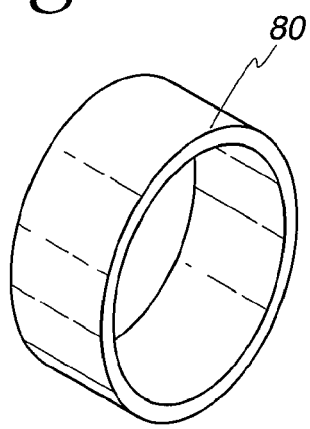
FIG. 21 is an isometric view showing a spacer which can be positioned between adjacent baffles.

The construction and assembly of the tubes, baffles and inner liners or spacers is suggested in FIGS. 18-26. Tube halves 140, 142, can be formed with mating corrugated shapes 143, and the baffles 50 can be nested at desired spacing within the corrugations as suggested in FIG. 18. The tube halves can then be assembled and locked together with suitable clamp locks 145 as suggested in FIG. 18*a*. Alternatively, unitary tubes 40 can be provided with a spiral corrugation 146 as shown in FIG. 19, and the spacers 50 can be mounted within the tube by a helical, screwing-like motion. Locking tabs 150 can be provided on the baffles 50 to mate with recesses (not shown) within the tube 40 as suggested in FIG. 19*a*. In yet another alternative arrangement, the tube 40 can be provided with an extended series of threads 155, and the baffles 50 can be provided with mating threads 156, as suggested in FIG. 20.

Figure 22:
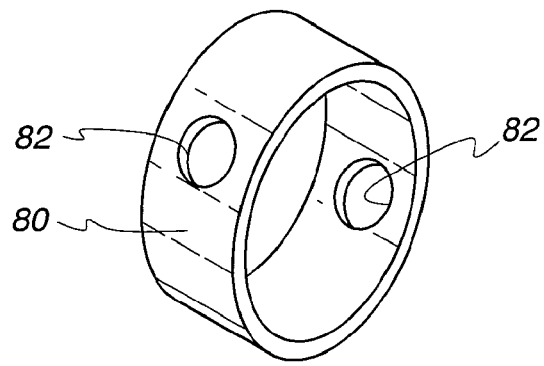
FIG. 22 is an isometric view similar to FIG. 21 but showing a spacer provided with two exhausts or viewing ports.
Figure 23:
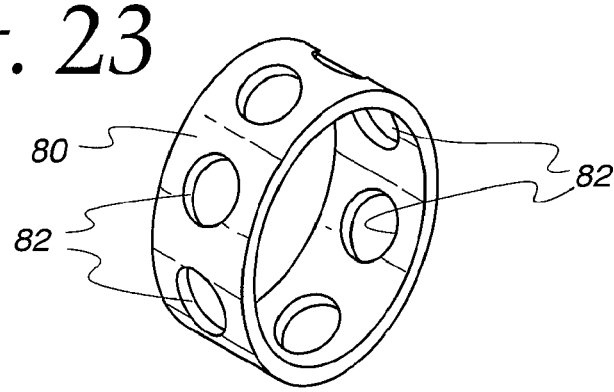
FIG. 23 is an isometric view similar to FIG. 22 but showing a spacer provided with multiple exhausts or viewing ports.
Figure 24:
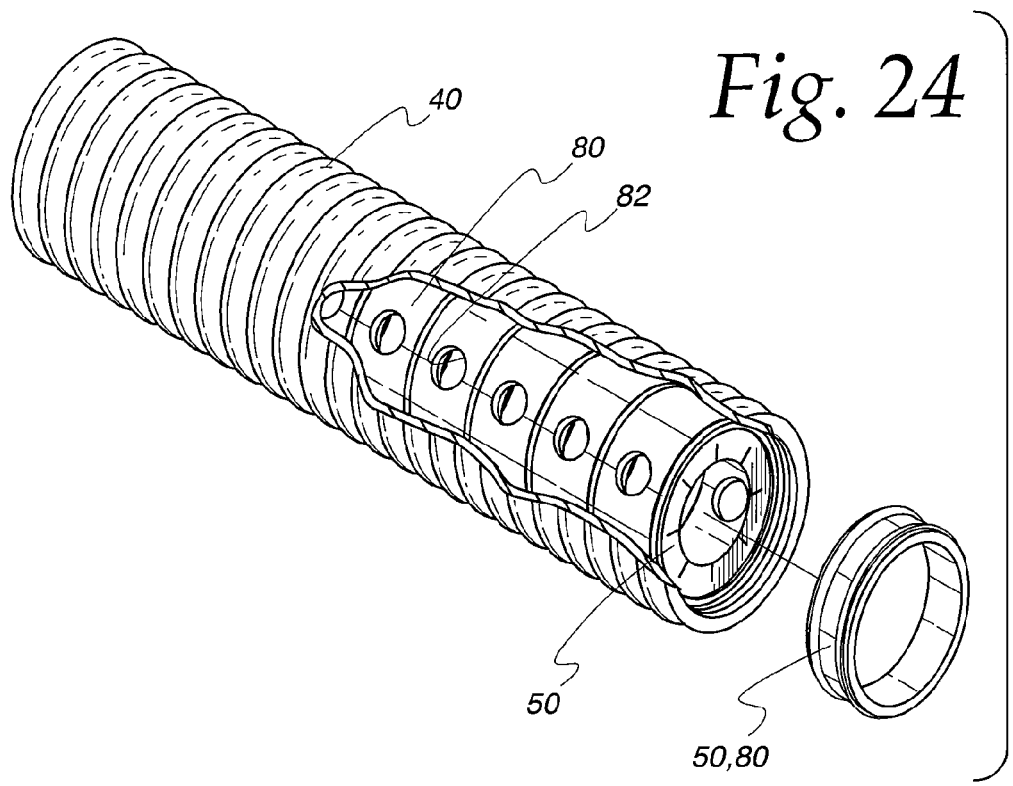
FIG. 24 is an isometric exploded view showing the tube, spacers and baffles 105 shown in FIGS. 19-23.
Figure 24A:
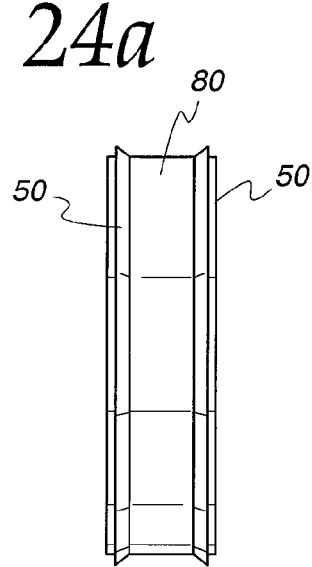
FIG. 24a is an elevational view showing a combination spacer and baffle of the type shown in FIG. 24.
Figure 25:
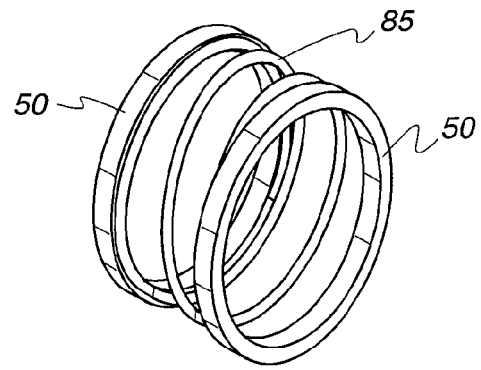
FIG. 25 is an isometric view of yet another spacer.

Spacers 80 (FIG. 21) can be made of soft material and can be located between the baffles 50. These spacers 80 can be provided with ports 82 (FIGS. 22 and 23). If the tube 40 is made of transparent material such as plastic, these ports 82 can be used to view and inspect the interior of the tube system. Alternatively, these ports 82 can provide the desired airflow if the tube system is provided with the coaxial tube arrangement described above. See FIG. 24. If desired, these spacers and baffles can be made as a single unit. See FIG. 24*a*. To mate with a helically corrugated tube, this spacer may be provided with a spring-like helix member 85 as suggested in FIG. 25.

Figure 26:
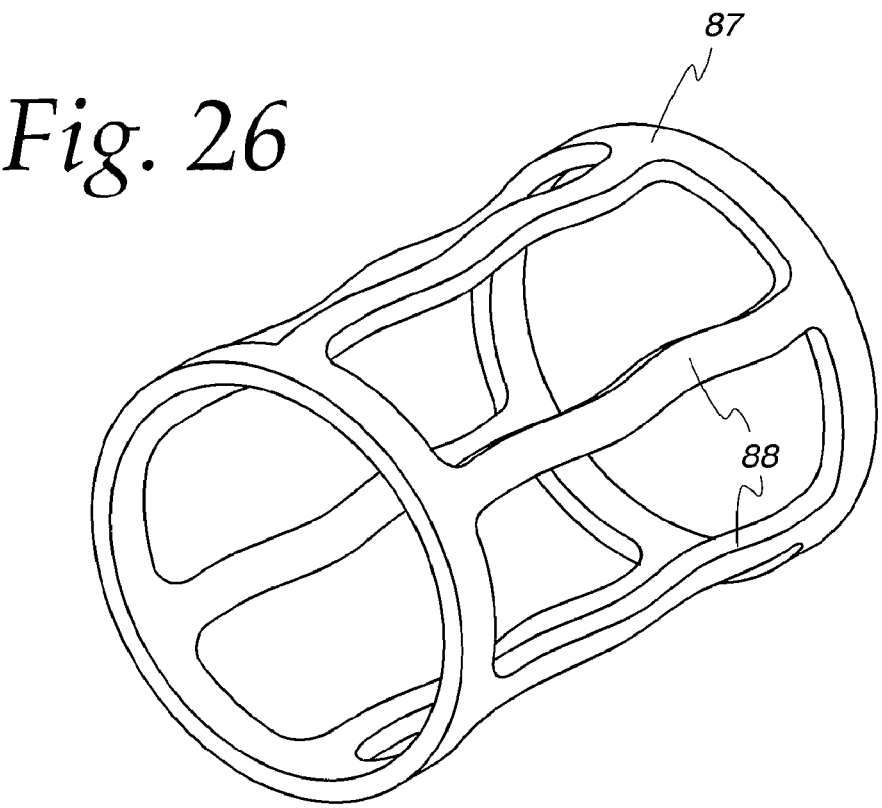
FIG. 26 is isometric view showing still another spacer.

An alternatively designed spacer 87 is shown in FIG. 26. This spacer is formed of soft, pliable material which will conform to the inner surface of a tube, whether corrugated or planer. Spaced apart arms 88 prevent the transported object from colliding with the rigid tube wall, but the spacing between these items 88 minimizes impedance to object travel.

Figure 27:
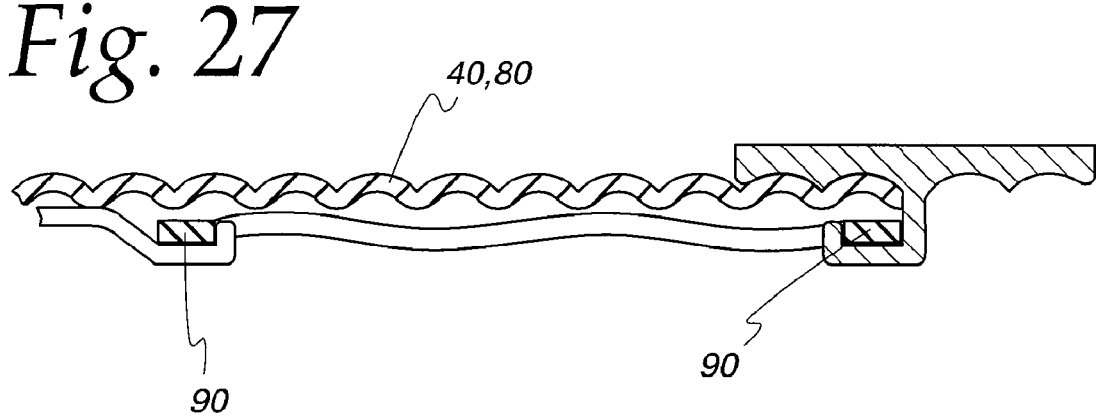
FIG. 27 is a fragmentary sectional view suggesting a structural arrangement which can be used to interconnect various tube sections.
Figure 28:
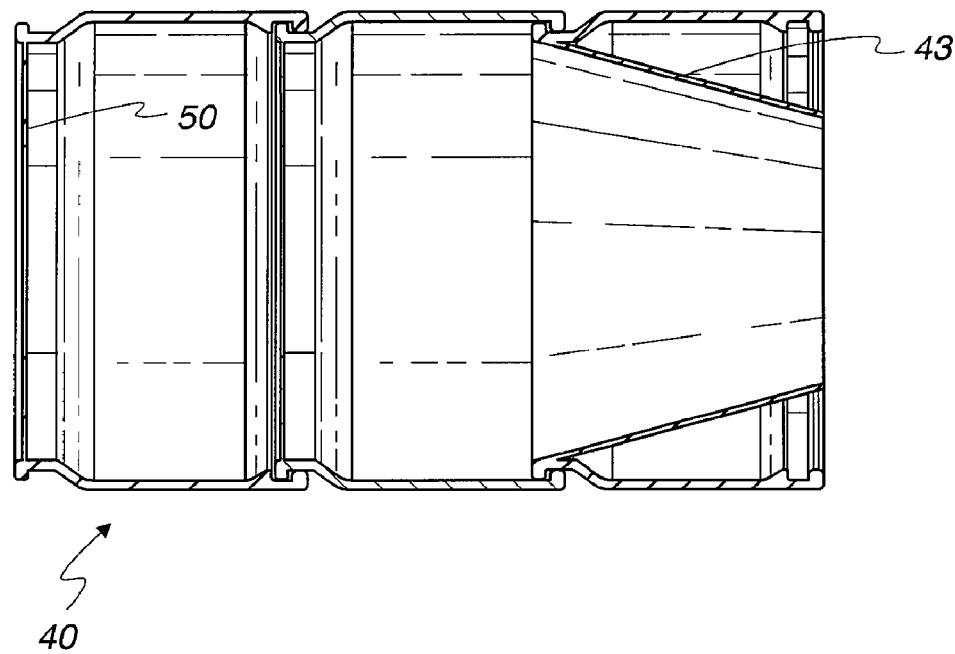
FIG. 28 is an elevational view of an air exhaust venturi mechanism.
Figure 29:
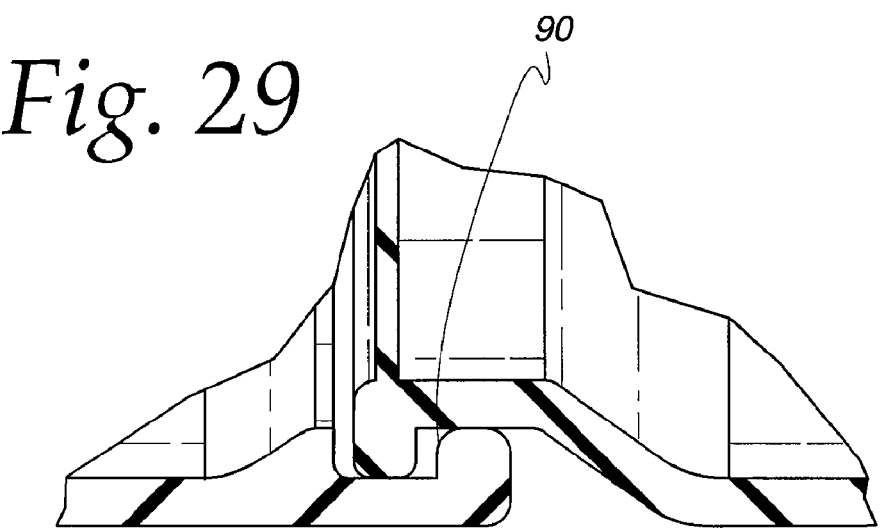
FIG. 29 is a fragmentary sectional view of a portion of FIG. 28.
Figure 30:
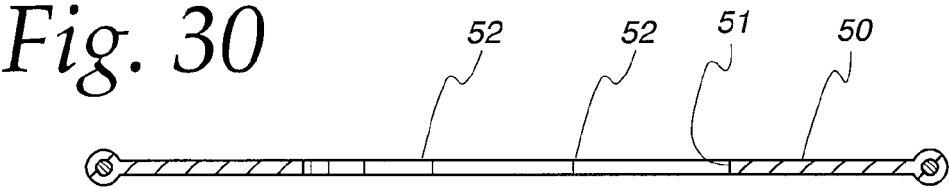
FIG. 30 is a sectional view of a disk-shaped baffle.
Figure 31:
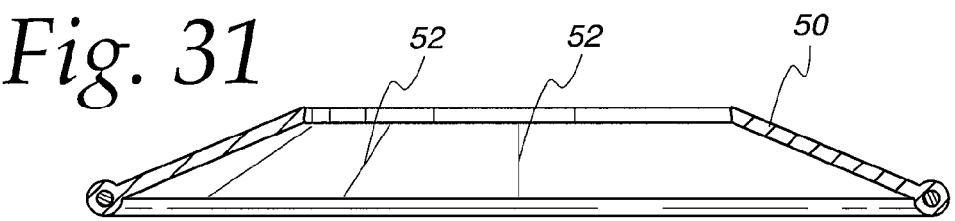
FIG. 31 is a sectional views similar to FIG. 30 but showing a conically shaped baffle.
Figure 32:
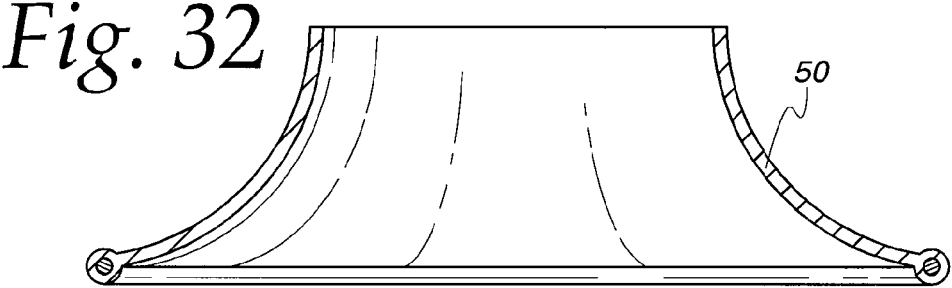
FIG. 32 is a sectional view similar to FIGS. 30 and 31 but showing another embodiment of the conical baffle.
Figure 33:
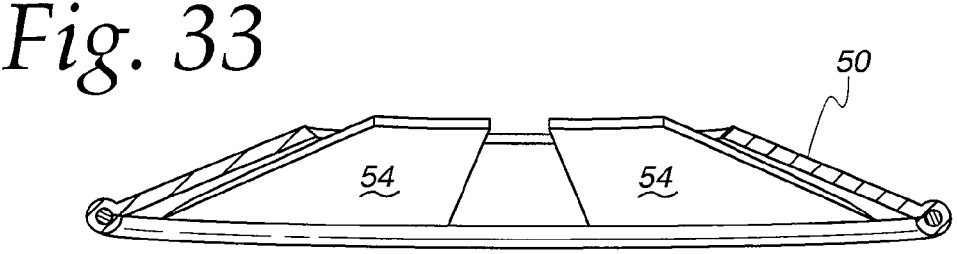
FIG. 33 is a sectional view similar to FIGS. 30-32 but showing yet another embodiment of the baffle.
Figure 34:
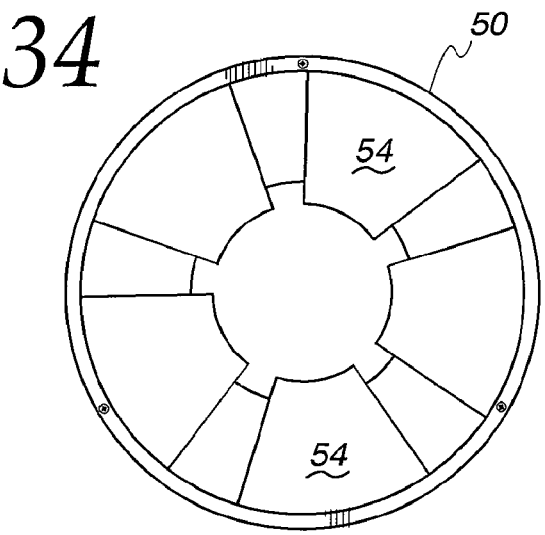
FIG. 34 is an elevational view of the baffle shown in FIG. 33.

FIGS. 27-29 suggest one of several known arrangements for interconnecting tube length modules. The tube sections can be snapped together by hand or with tools to form a flexible tube assembly. The joints 90 are self-sealing but slide to provide flexibility.

Figure 35:
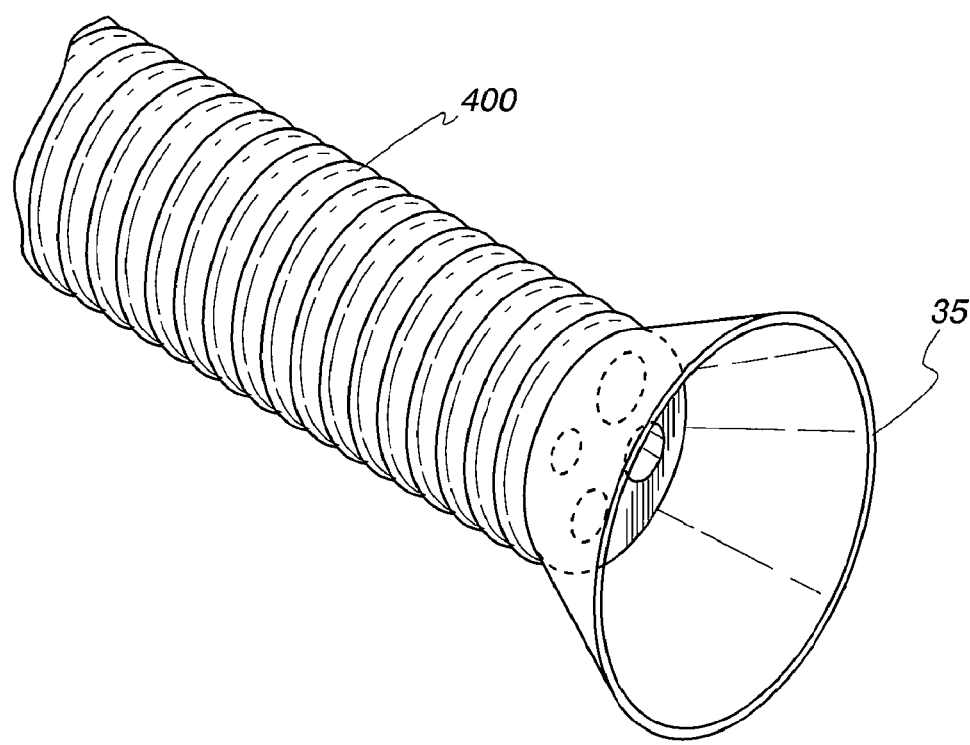
FIG. 35 is a fragmentary elevational view showing yet another embodiment of the transport tube and an associated input device.

If desired, a series of transport tubes can be carried within a relatively large conduit 400, as suggested in FIG. 35. The conduit 400 can be equipped with a delivery chute 35 so that the picker can place objects of varying sizes in tubes of appropriate and corresponding diameter.

FIG. 36 illustrates an alternate embodiment of the invention and associated equipment. As indicated above in FIG. 1, the pneumatic tube system can be used by individual pickers. The picker P can be mounted on a platform 644 if desired. Picked fruit can be deposited into a tube 640 which transports that picked fruit to a receiving decelerator 642. The fruit can be withdrawn from the decelerator by an extraction conveyor 650 and deposited upon a cross-conveyor 652 which transports the fruit or other objects past an inspection subsystem 660. The inspected fruit or other objects can then be gently lowered, as by a download conveyor 670, into a receiving bin N. Vehicle mobility can be provided by a prime mover and track system 680. The bin can be dropped from the system along conveyor forks 680, 690 for subsequent pickup by a collection truck or other operation.

As shown in FIGS. 37-41, an alternate embodiment of the transport system 700 includes a bi-ended tube member 701, which can have a non-circular cross-sectional shape. As suggested in FIG. 37*a*, the cross-sectional shape of the tube 701 can be triangular with rounded corners, or trilobular. As indicated above, the noncircular cross-sectional shape of the tube can be oval, rhomboid, quadrilateral or of other convenient shape.

Within the tube 701 is a plurality of apertured, deformable baffles 710 secured at axially spaced apart locations throughout the length of the tube. These baffles are sized and shaped and otherwise adapted to at least partly engage the surface of an article A being transported through the tube so as to encourage the development of at least a momentary pressure differential across the article being transported as the article moves through the tube, and to thereby advance the object to each baffle and along the tube to the next baffle. The baffles can be spaced apart from one another so that the distance between adjacent baffles is such that the object being transported is in substantial engagement, and in substantially continuous engagement, with at least one baffle at all times as the object being transported moves through the tubes. In these circumstances, the article being transported through the tube experiences a substantially continuous front-to-rear pressure differential across the article as the article moves through the tube, so as to advance the article through the baffles and along the tube.

Figure 4:
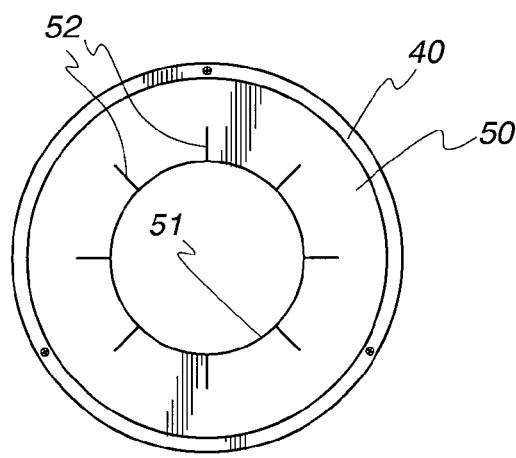
FIG. 4 is an elevational view of a typical baffle found within one embodiment of a transport tube.
Figure 5:
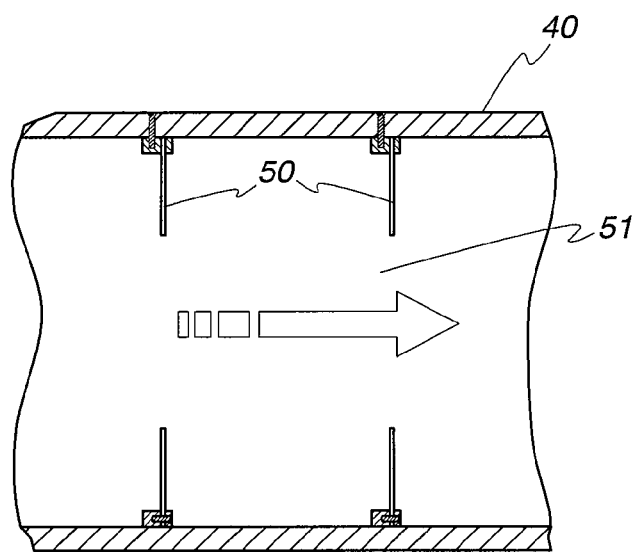
FIG. 5 is a sectional view of a typical transport tube and, mounted therein, the baffles of FIG. 4.
Figure 6:
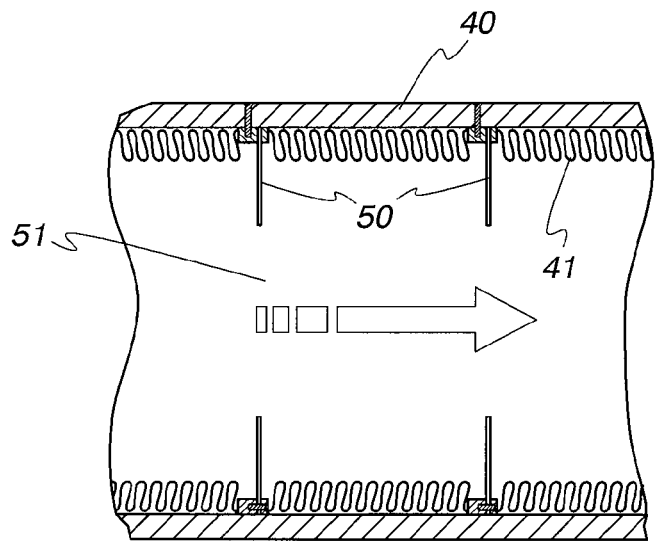
FIG. 6 is a sectional view of a typical transport tube similar to FIG. 5 but showing resilient material mounted between the baffles.
Figure 7:
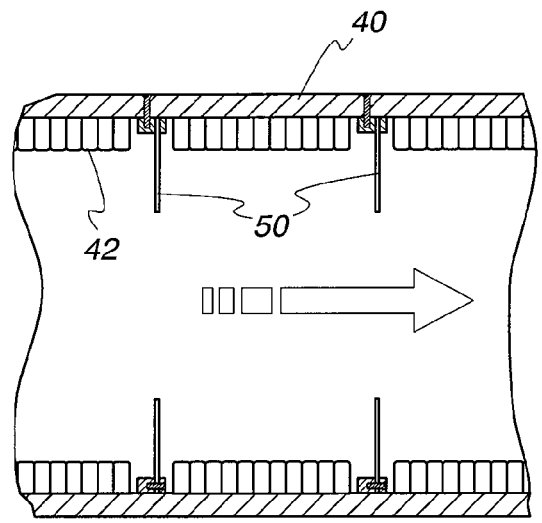
FIG. 7 is a sectional view similar to FIG. 6 but showing a different form of resilient material mounted between the baffles
Figure 8:
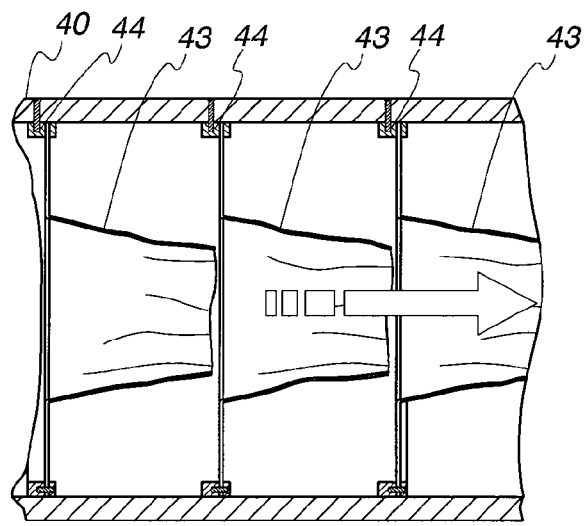
FIG. 8 is a sectional view similar to FIGS. 5, 6 and 7 showing a typical conical or windsock-shaped baffle.
Figure 9:
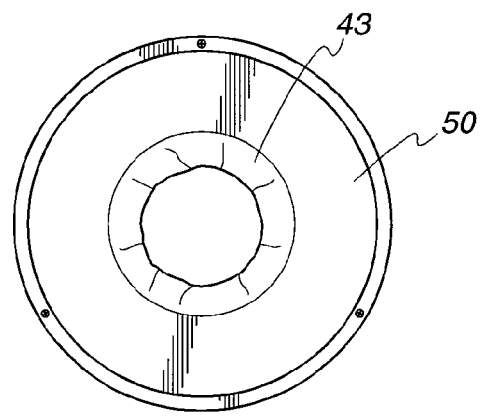
FIG. 9 is an elevational view of the baffle shown in FIG. 8.

If it is desired to provide greater flexibility and deformability to the baffles, the baffles may be provided with generally radially extending slits as suggested in FIG. 4. If extensive baffle deformation is not necessary or desired, the baffles can be unslitted and unslotted as suggested in FIGS. 9, 10, 14 and 37a.

Figure 37A:
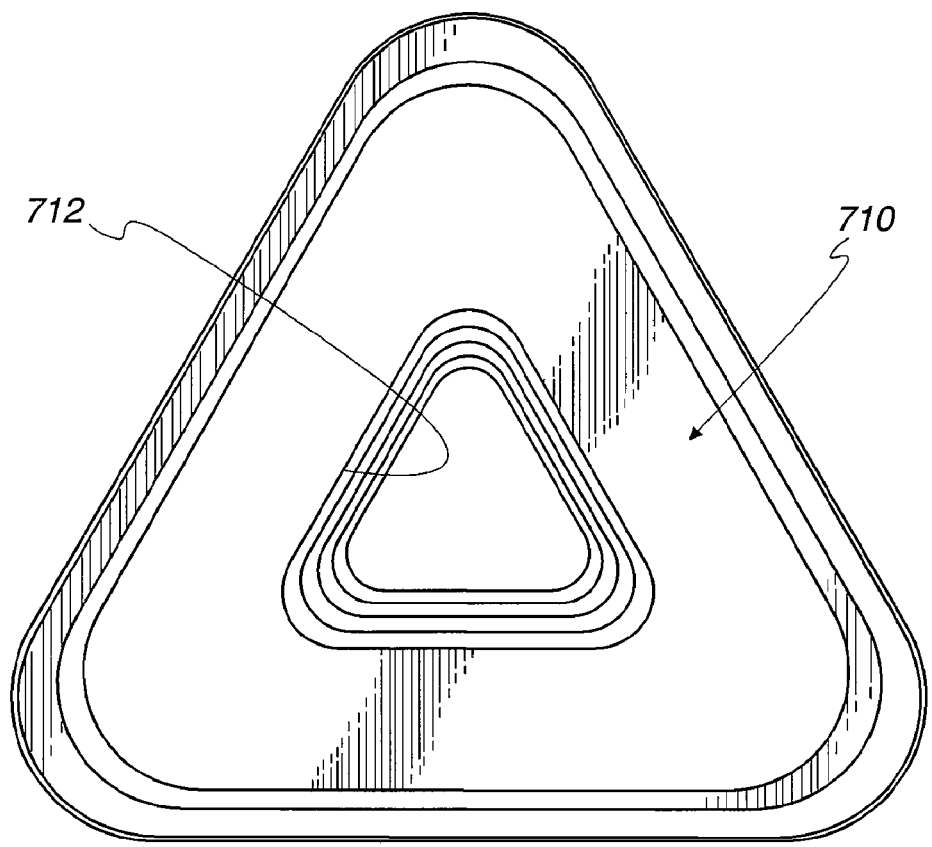
FIG. 37 is a cross-sectional view of another embodiment of the transport tube system and showing a generally spherical object such as an orange moving through the system.

As suggested in FIG. 37a, the shape of the baffle apertures 712 can be trilobular, oval, rhomboid, quadrilateral, or other convenient shape. If the cross-sectional shape of the object being transported is irregular, the size and shape of the baffle aperture 712 can be made to approximate the cross-sectional shape of the object being transported through the tube. Experimentation suggests that the Triangular or non-circular orifice opening in the aligned baffles provides more effective transport than circular or random pattern orifice. This is most apparent for smaller objects on the order of 2.25 to 3-inch diameter. The smaller object may tend to oscillate or vibrate within the transport tube because generally round objects can be influenced more by a generally round orifice so that the object will tend to spiral in a helical centrifugal fashion. Side to side oscillations may also occur because a round object is more readily captured or contained within a generally round orifice. Aligned triangular or non-circular orifices will tend to guide or dampen side to side motion of the transported object and provide more effective transport. The triple walls of the Triangular orifice also tend to guide the object in a 3-point manner to the center with limited friction when compared to a fully circumferential contact of the same aspect.

Figure 39:
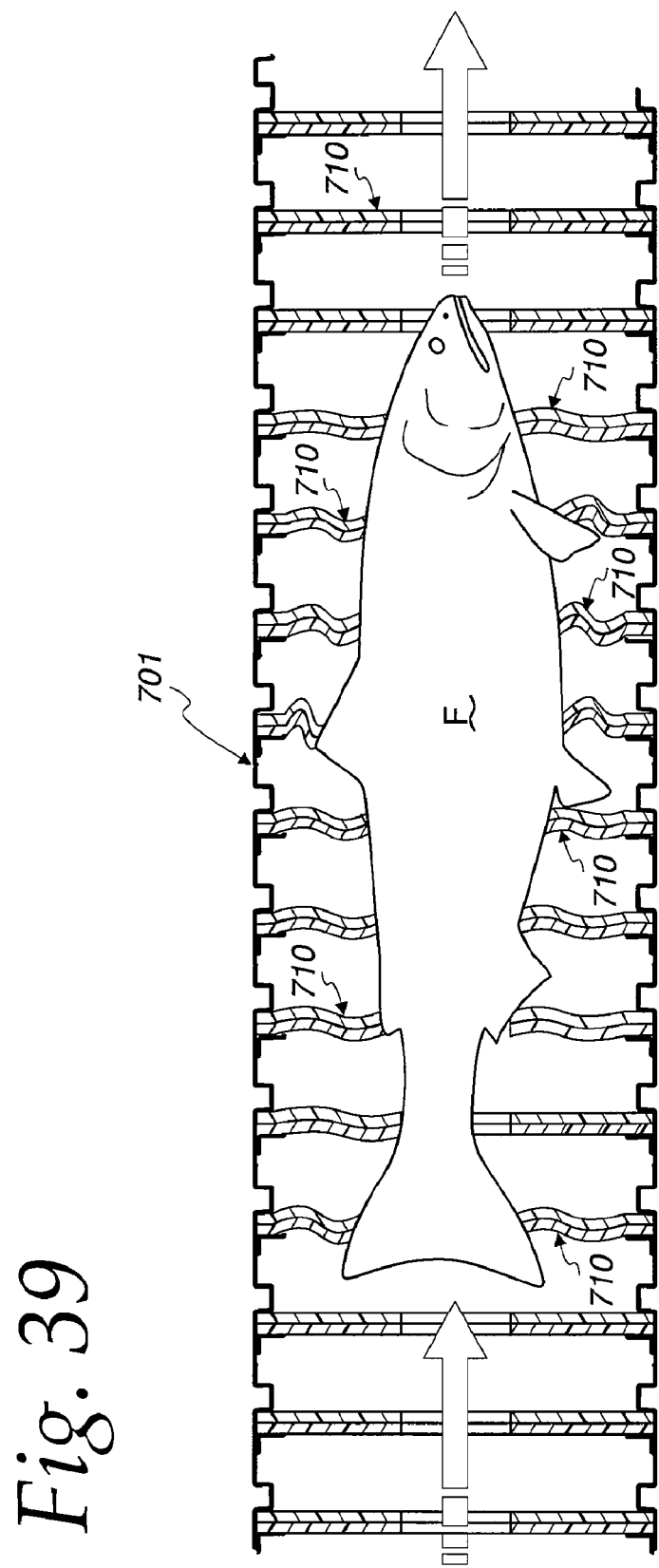
FIG. 39 is a cross-sectional view of another embodiment of the transport tube system similar to FIGS. 37 and 38 but showing an elongated object such as an adult fish moving through the system.
Figure 40:
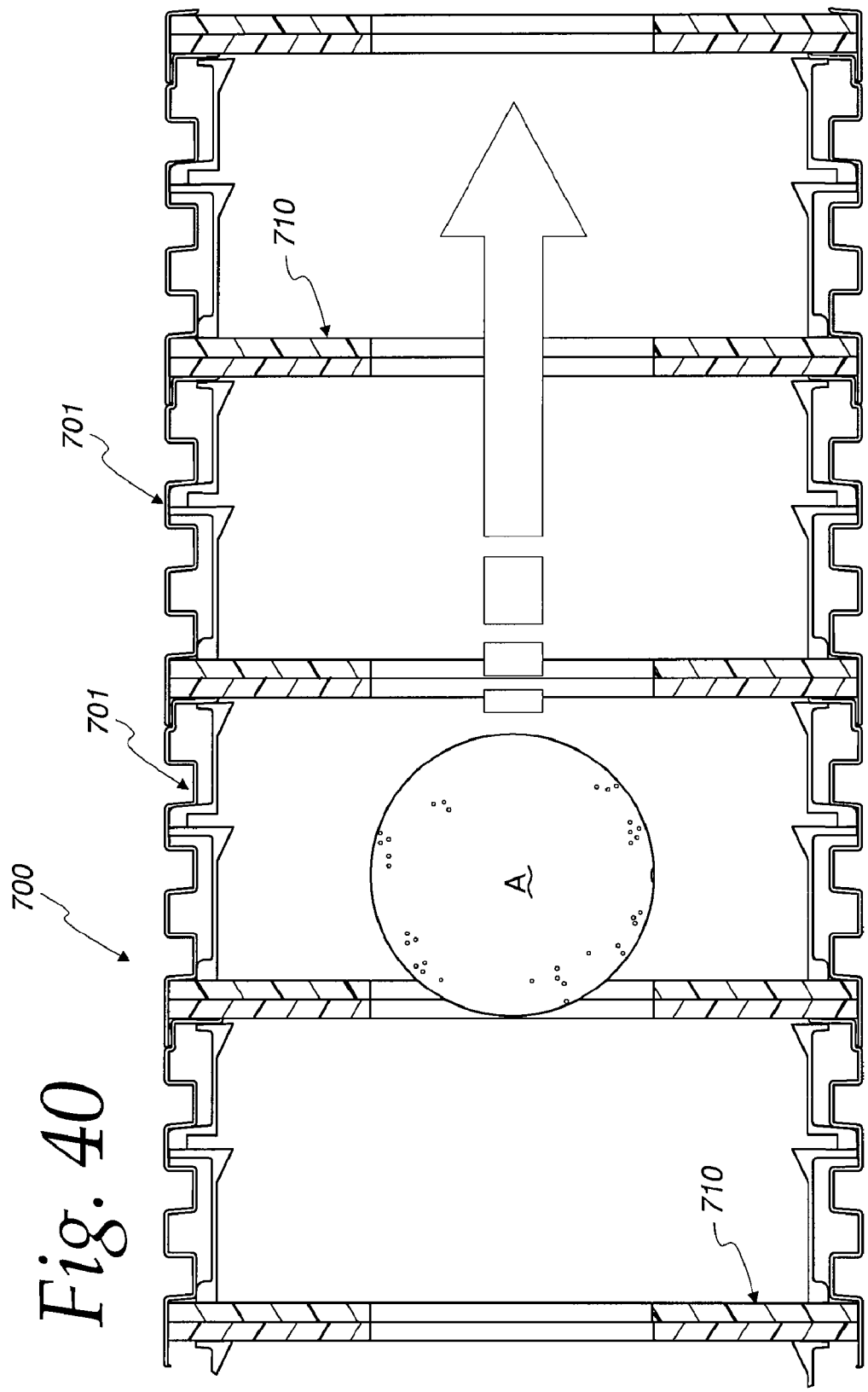
FIG. 40 is a cross-sectional view of yet another embodiment of the transport system similar to FIGS. 36, 37, 38 and 39, but showing an alternate form of the transport system.

Elongated articles can be transported by the system. As illustrated in FIG. 39, fish F have been successfully transported by the system. Here, this fish F is engaged by a relatively great plurality of baffles 710 and, indeed, the weight of the fish is supported by these baffles so that the fish is maintained in a position within the tube 701 substantially separated from any contact with tube interior surface, thereby avoiding damage or injury to the fish.

Figure 41:
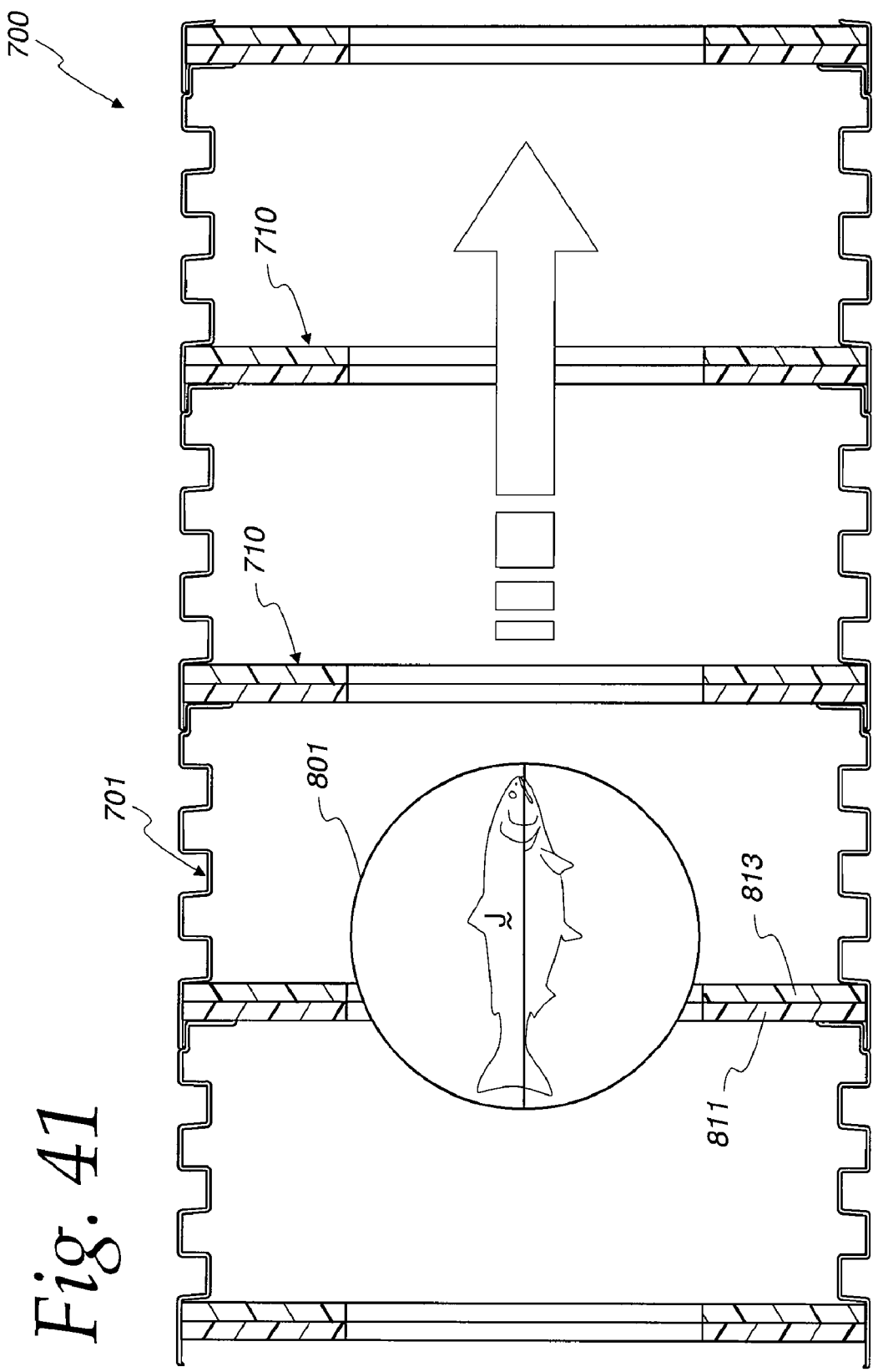
FIG. 41 is a cross-sectional view yet another embodiment of the transport system similar to FIG. 40, but showing use of the system to transport a juvenile fish.
Figure 42:
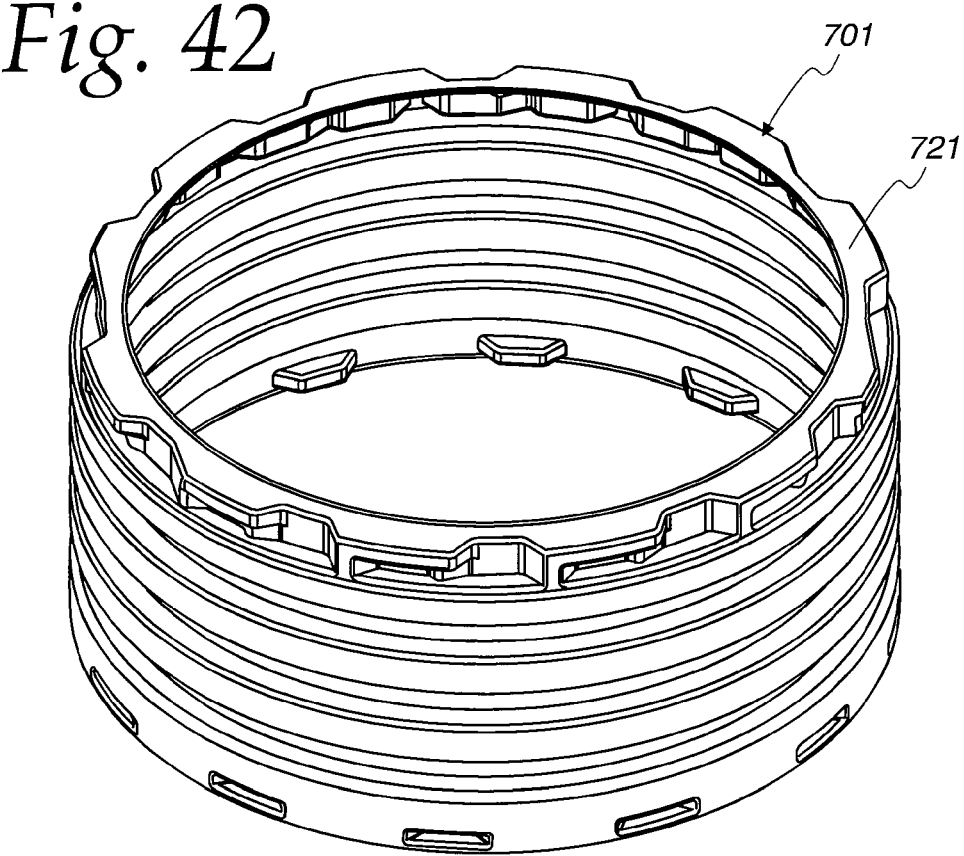
FIG. 42 is an isometric view showing a transport tube module.
Figure 43:
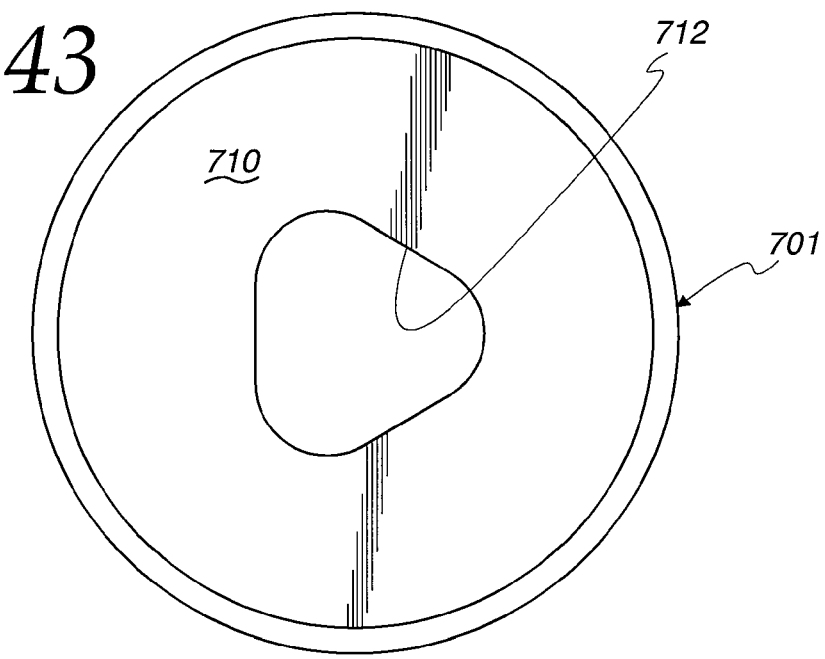
FIG. 43 is a plan or elevational view of another embodiment of a baffle used with the tube portion of the invention.

Juvenile fish J of various sizes can also be transported by the system as suggested in FIG. 41. To decrease injury, trauma and mortality, it may be prudent to encapsulate these fish J in a transparent water-filled sphere 801 and then transport the spheres through the baffles 710 and tube 701.

To minimize friction between the baffles and the object being transported to provide baffle resiliency and long service life, the baffles can be constructed in a laminate form. Forward or upstream portion of the baffle laminate can be formed from or contain a low-friction material such as Teflon, while the rear portion of the baffle can be formed of Kevlar or other suitable material. Teflon is a polytetrafluoroethylene material and Kevlar is a para-aramid material; both materials are available from the EI Du Pont de Nemours Corporation of Wilmington Del. The baffle portions may act independently of one another and may or may not be affixed to one another or to any third or fourth layer. This design is intended to extend the life of the sealing baffle from sharp thorns and stems found in citrus and fish hooks in fish. The low friction composite layer also limits the contact time of the fruit on the surface of the rear portion or rear laminate thereby eliminating any natural frequencies or oscillations of the fruit during transport. If the object being transported begins to oscillate, it will undergo greater object/baffle friction and slower transport times.

Figure 44:
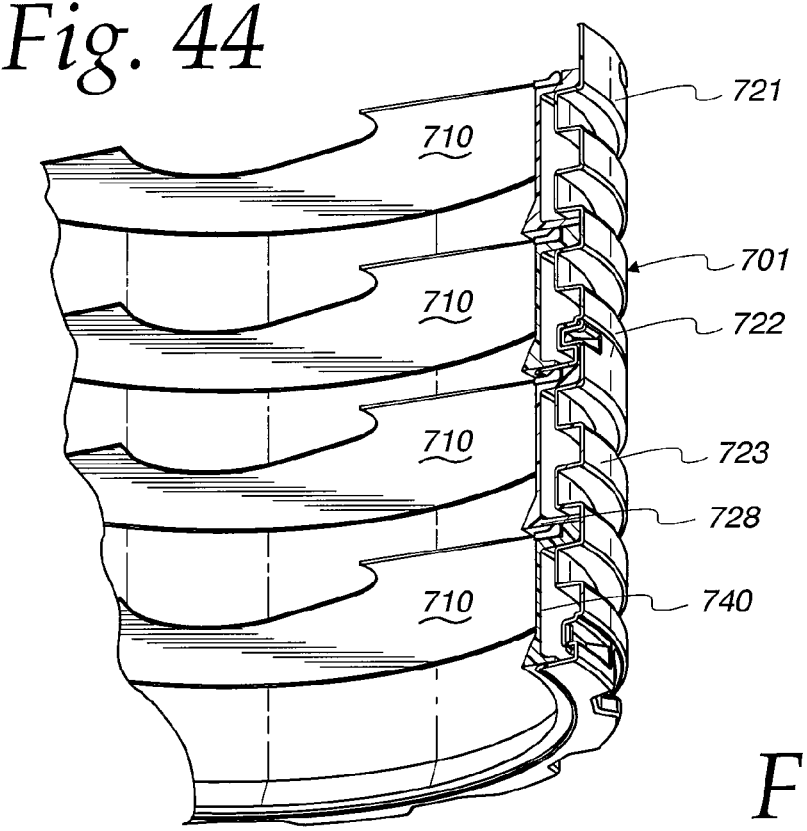
FIG. 44 is a fragmentary isometric view in partial section showing an embodiment of the invention comprising two modules and associated baffles.
Figure 45:
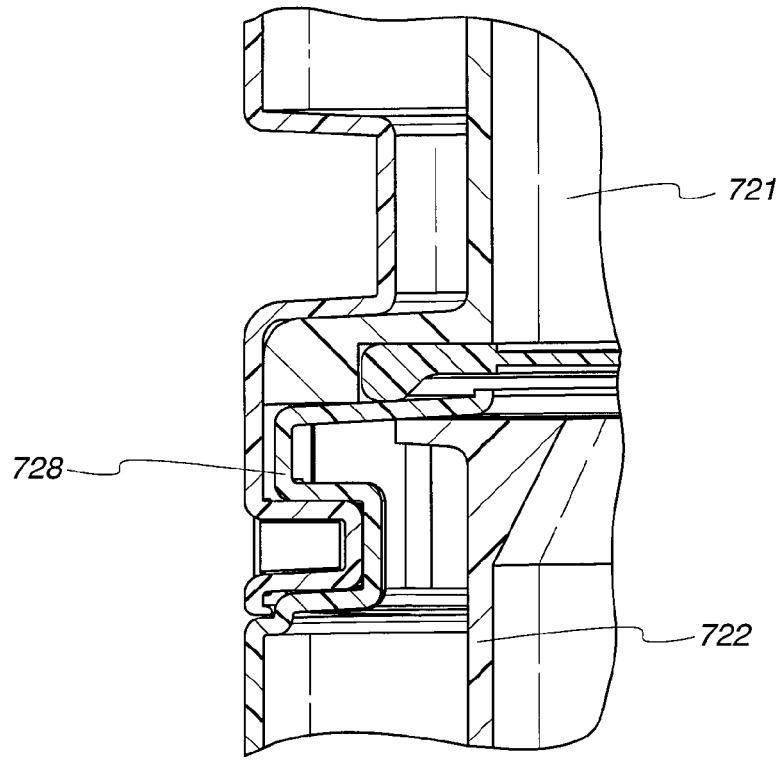
FIG. 45 is a fragmentary sectional view showing portions of the modular tube and associated baffles indicated in FIG. 44.

Transport tube 701 can be formed as a single element or it can be assembled from a series of interconnected modules 721, 722, 723 as shown in FIGS. 37, 38 and elsewhere. Interlock mechanisms 728 shown in FIGS. 44, 45 and elsewhere permit the tube modules 721, 722 and 723 to be joined together to provide a tube of any desired length and can also be provided with interior surface structures 740 to provide a smooth, continuous inner surface in the tube.

Figure 46:
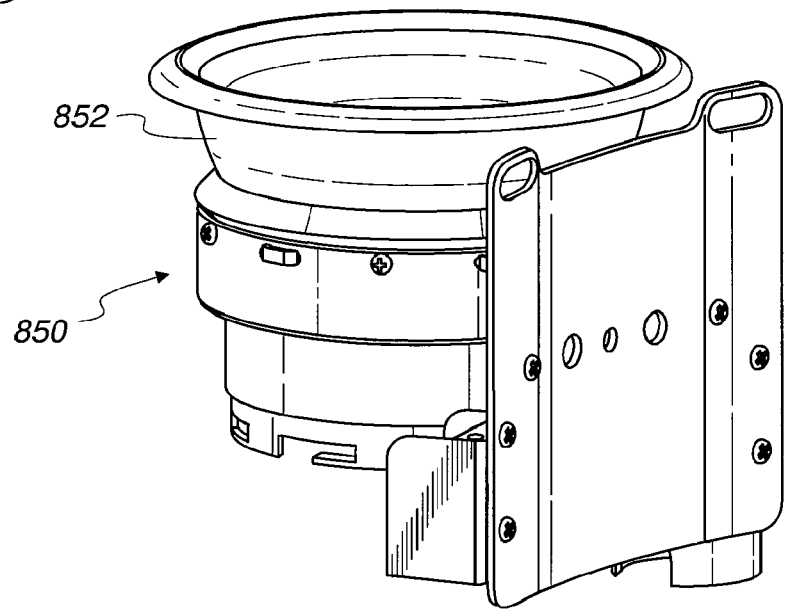
FIG. 46 is an isometric view showing a tube intake port mechanism.
Figure 47:
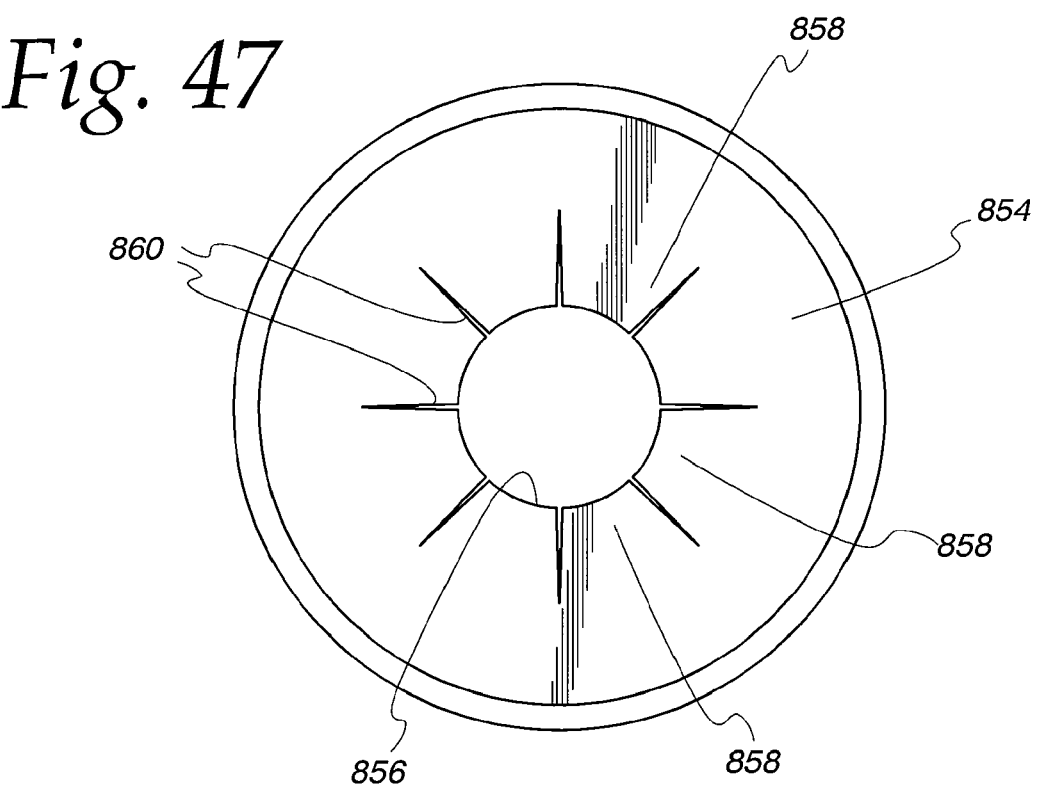
FIG. 47 is a plan or elevational view showing an initial or first baffle for use with the tube.
Figure 48:
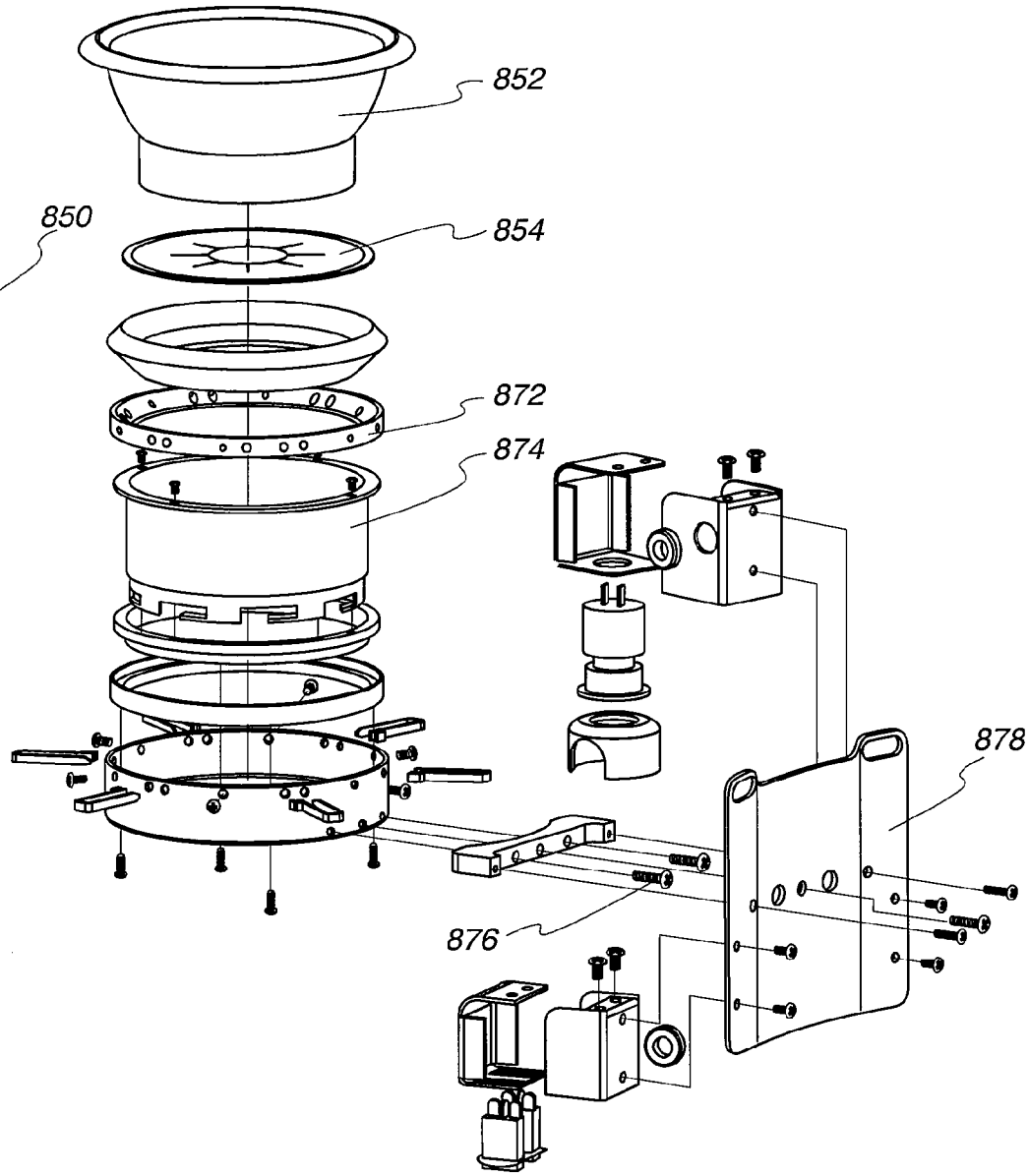
FIG. 48 is an exploded view of the tube intake port mechanism shown in FIG. 46.

A system portal intake device 850 is shown in FIGS. 46 and 48. This device permits fruit or other objects to be introduced to the transport system with minimal likelihood of damage to the object and minimal likelihood of clogging of the tube. In the illustrated embodiment, a conical receiving bowl 852 is located above an introductory baffle 854. As shown in FIGS. 47 and 48, this baffle 854 can be provided with an aperture 856 to center the object being transported upon the central axis of the transport tube. To encourage this centering action, radially extending slits 860 of slightly diverging profile are formed in an intake baffle 854, thus creating a series of centering fingers 858. This device also dampens object rotation and kinetic energy induced aberrant movement of the object. Excessive kinetic energy exhibit exhibited by the transported object can cause unwanted vibrations or oscillations of the object during object transport. These oscillations can hamper the speed of object transport or lessen the pneumatic potential of the transported object. Interconnectors, seal rings and other structures are attached, as by bolts or other known mechanisms 872, 874, to a mounting plate 878 for attachment of the portal intake device 850 to the vehicle in positions convenient to the pickers P.

We claim:

1. A combination comprising: a bi-ended tube member adapted to receive and transport articles:
   a pneumatic system for creating a pressure differential between the tube ends;
   a plurality of apertured deformable baffles at axially spaced-apart locations throughout the length of the tube;
   at least one of said baffles having a multi-layered laminate construction including a forward layer having a low-friction constituent and a rear layer having a para-aramid material;
   wherein the baffles are adapted to at least partly engage the surface of an article being transported so as to encourage the development of at least a momentary pressure differential across the article being transported as the article moves through the tube, and thereby advance the object through the baffle and along the tube to the next baffle.

2. A combination according to claim 1 wherein at least some of the baffles are unslitted and unslotted.

3. A combination comprising a bi-ended tube member adapted to receive and transport articles;
   a pneumatic system for creating a pressure differential between the tube ends;
   a plurality of apertured deformable baffles at axially spaced-apart locations throughout the length of the tube;
   at least one of said baffles having a multi-layered construction including a forward layer having a low-friction constituent and a rear layer having a para-aramid material;
   wherein at least some of the baffles define non-circular apertures;
   the baffles being adapted to at least partly engage the surface of an article being transported so as to encourage the development of at least a momentary pressure differential across the article being transported as the article moves through the tube, and thereby advance the object through the baffle and along the tube to the next baffle.

4. A combination according to claim 3 wherein at least one of the baffles is unslitted and unslotted.

5. A combination according to claim 3 wherein the noncircular cross-sectional shape of the baffle aperture is trilobular.

6. A combination comprising a bi-ended tube member adapted to receive and transport articles;
- a pneumatic system for creating a pressure differential between the tube ends;
- a plurality of apertured but deformable baffles of laminate construction including a forward layer having a low-friction constituent and a rear layer having a para-aramid material at axially spaced-apart locations throughout the length of the tube;
- the baffles being spaced apart from one another so that the distance between adjacent baffles is such that the object being transported is in substantial engagement with at least one baffle at all times as the object being transported moves through the tube.

7. A combination according to claim 6 wherein at least one of the baffles is unslitted and unslotted.

8. A combination comprising a bi-ended tube member adapted to receive and transport articles;
- a pneumatic system for creating a pressure differential between the tube ends;
- a plurality of apertured but unslitted, unslotted deformable baffles at axially spaced-apart locations throughout the length of the tube;
- at least one of said baffles having a multi-layer laminate construction including a forward layer having a low-friction constituent and a rear layer having a para-aramid material;
- the baffles being spaced apart from one another so that an article being transported through the tube experiences a substantially continuous front-to-rear pressure differential across the article as the article moves through the tube, thereby to advance the object through the baffles and along the tube.

9. A combination according to claim 8 wherein said laminate baffle includes a forward layer including a low-friction constituent.

10. A combination comprising a bi-ended tube member adapted to receive and transport articles;
- a pneumatic system for creating a pressure differential between the tube ends;
- and a plurality of apertured deformable baffles of laminate construction including a forward layer having a low-friction constituent and a rear layer having a para-aramid material located within the tube wherein the baffles are adapted to at least partly engage the surface of an article being transported; and wherein the baffles are spaced apart from one another at axially spaced-apart locations throughout the length of the tube so that the article being transported within the tube is substantially continuously engaged by a plurality of baffles as the article moves through the tube.

11. A combination comprising a bi-ended tube member adapted to receive and transport articles of at least approximately pre-determined dimensions;
- a pneumatic system for creating a pressure differential between the tube ends;
- and a plurality of apertured deformable baffles of laminate construction including a forward layer having a low-friction constituent and a rear layer having a para-aramid material located within the tube wherein the baffles are adapted to at least partly engage the surface of an article being transported; and
- wherein the baffles are spaced apart from one another at axially spaced-apart locations throughout the length of the tube so that the article being transported within the tube is substantially maintained in a position within the tube by one or more baffles so as to be substantially separated from any contact with the tube interior surface.

12. A method of transporting an article having a major dimension and a minor dimension through a tube having apertured baffles therein which are spaced apart throughout the length of the tube, the method comprising the steps of:
- determining the major and minor dimension of the article to be transported through the tube;
- spacing the baffles apart from one another within the tube by a distance approximately equal to or less than the determined major dimension of the article to be transported;
- providing the tube baffles with a low-friction constituent and with apertures approximately equal to or less than the determined minor dimension of the article to be transported;
- receiving an article dimensionally similar to the minor dimension of the determined article in a tube upstream end;
- creating a pressure differential across the article within said tube so as to cause said article to move and continuously sequentially engage the baffles through said tube; and
- depositing the article in a predetermined location after the article is delivered to a downstream tube end.

13. A combination comprising:
- a bi-ended tube member adapted to receive and transport articles;
- a pneumatic system for creating a pressure differential between the tube ends;
and a plurality of apertured but deformable baffles of laminate construction including a forward layer having a low-friction constituent and a rear layer having a para-aramid material at axially spaced apart locations throughout the length of the tube;
- the bi-ended tube member comprising a plurality of interconnectable tube modules; and
- at least one of the tube modules having a baffle affixed therein.

14. A combination according to claim 13 wherein said tube is provided with a smooth, continuous, low friction inner surface.

15. A combination comprising a bi-ended tube member adapted to receive and transport articles;
- a pneumatic system for creating a pressure differential between the tube ends;
- a plurality of apertured deformable baffles of laminate construction including a forward layer having a low-friction constituent and a rear layer having a para-aramid material at axially spaced apart locations throughout the length of the tube;
- wherein at least some of said baffles define non-circular apertures;
- the baffles being adapted to at least partly engage the surface of an article being transported so as to encourage development of at least a momentary pressure differential across an article being transported as the article moves through the tube and thereby advance the object through the baffle and along the tube to the next baffle,
- and a portal intake device in fluid communication with an upstream end of the tube end; the portal intake device including a deformable introductory battle,
- the introductory baffle having a series of centering fingers defined by radially extending slots of diverging profile and by finger ends, the finger ends being in radial alignment with the axial center of the transport tube intake end for centering an object being introduced to the tube on the tube axial center.

16. A portal intake device in fluid communication with an upstream end of a bi-ended tube member adapted to receive and transport articles; the portal intake device defining a transport tube intake end and including a deformable introductory battle,
  wherein the introductory baffle includes a series of centering fingers of laminate construction including a forward layer having a low-friction constituent and a rear layer having a para-aramid material and defined by radially extending slots of diverging profile and by finger ends, the finger ends being in radial alignment with the axial center of the transport tube intake end for centering an object being introduced into the tube member on the tube member axial center.

* * * * *